(12) United States Patent
Costache et al.

(10) Patent No.: US 9,250,367 B2
(45) Date of Patent: Feb. 2, 2016

(54) FLUIDIC VARIABLE FOCAL LENGTH OPTICAL LENS AND METHOD FOR MANUFACTURING THE SAME

(71) Applicant: Fraunhofer-Gesellschaft zur Foerderung der angewandten Forschung e.V., Munich (DE)

(72) Inventors: Florenta Costache, Dresden (DE); Harald Schenk, Dresden (DE); Kirstin Bornhorst, Dresden (DE); Christian Schirrmann, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/744,786

(22) Filed: Jan. 18, 2013

(65) Prior Publication Data

US 2013/0128368 A1    May 23, 2013

Related U.S. Application Data

(63) Continuation of application No. PCT/EP2010/060496, filed on Jul. 20, 2010.

(51) Int. Cl.
*G02B 1/06* (2006.01)
*G02B 3/12* (2006.01)
(Continued)

(52) U.S. Cl.
CPC .............. *G02B 3/14* (2013.01); *G02B 26/004* (2013.01)

(58) Field of Classification Search
CPC .......... G02B 3/14; G02B 3/12; G02B 26/005; G02B 13/0075; G02B 7/04; G02C 7/085; G02C 7/083

USPC .................................................. 359/665, 666
See application file for complete search history.

(56) References Cited

U.S. PATENT DOCUMENTS

| 6,188,526 B1 | 2/2001 | Sasaya et al. |
| 7,580,195 B2 | 8/2009 | Choi et al. |

(Continued)

FOREIGN PATENT DOCUMENTS

| DE | 10 2007 004 080 A1 | 8/2008 |
| EP | 1 921 471 A1 | 5/2008 |

(Continued)

OTHER PUBLICATIONS

Official Communication issued in International Patent Application No. PCT/EP2010/060496, mailed on Apr. 5, 2011.

(Continued)

*Primary Examiner* — Alicia M Harrington
(74) *Attorney, Agent, or Firm* — Keating & Bennett, LLP

(57) ABSTRACT

A fluidic variable focal length optical lens has a sealed housing having a first fluidic chamber filled with a first fluidic medium and a second fluidic chamber filled with a second fluidic medium, the first and the second fluidic chamber being separated from each other by an elastic membrane, wherein the first and the second fluidic medium have different refractive indices, and a deformator configured to deform the membrane laterally within a pump zone, thereby laterally displacing the first fluidic medium from the pump zone to a lens zone and the second fluidic medium from the lens zone to the pump zone, so that the membrane also deforms in the lens zone and changes a focal length of the lens zone along a normal direction.

12 Claims, 16 Drawing Sheets

(51) Int. Cl.
*G02B 3/14* (2006.01)
*G02B 26/00* (2006.01)

(56) References Cited

U.S. PATENT DOCUMENTS

| | | | |
|---|---|---|---|
| 8,027,095 B2* | 9/2011 | Havens | 359/666 |
| 2007/0188882 A1 | 8/2007 | Cernasov | |
| 2009/0180198 A1* | 7/2009 | Lee et al. | 359/666 |
| 2010/0110560 A1* | 5/2010 | Cho | 359/666 |
| 2010/0118414 A1 | 5/2010 | Bolis | |
| 2010/0165475 A1 | 7/2010 | Lee et al. | |

FOREIGN PATENT DOCUMENTS

| | | |
|---|---|---|
| GB | 2 448 238 A | 10/2008 |
| WO | 2007/069213 A2 | 6/2007 |

OTHER PUBLICATIONS

Draheim et al., "Fabrication of a fluidic membrane lens system", J. Micromech. Microeng. 19 (2009) 095013, 7 pages.

* cited by examiner

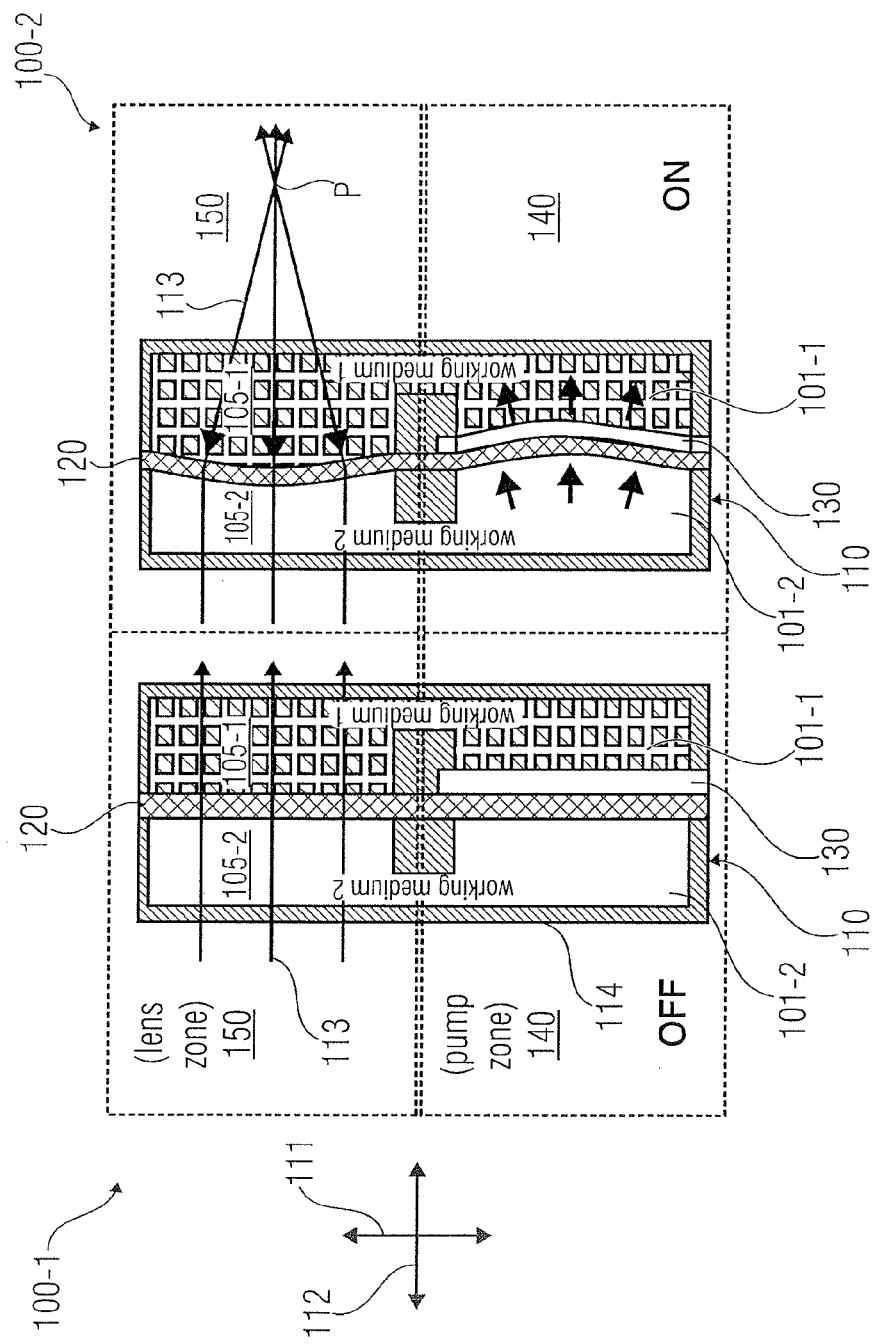

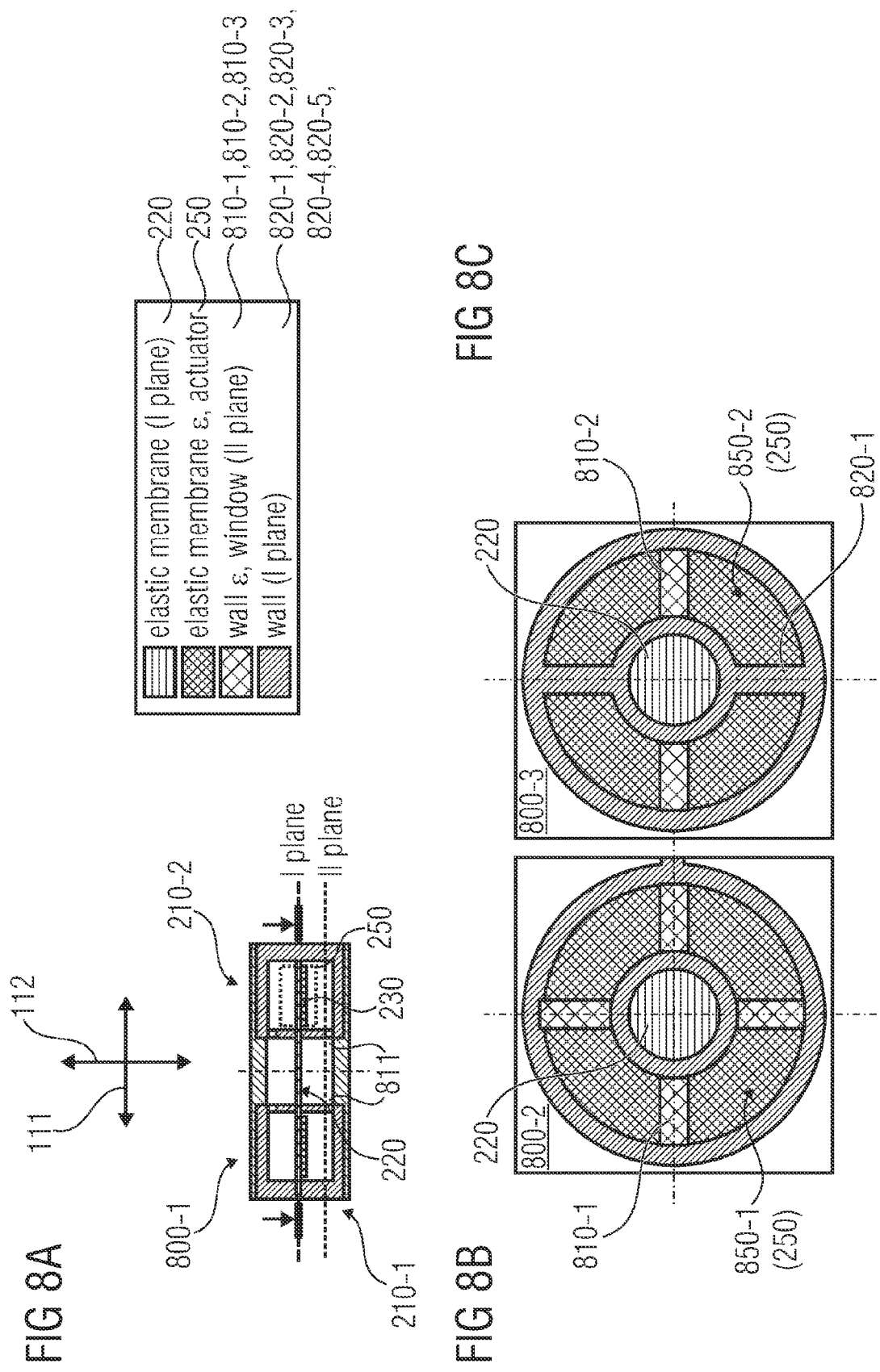

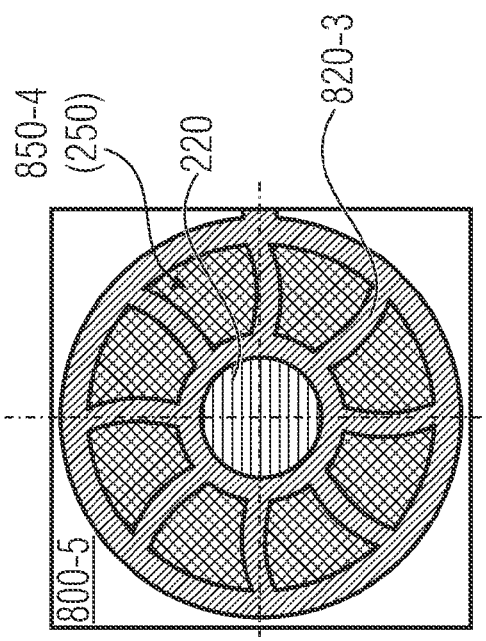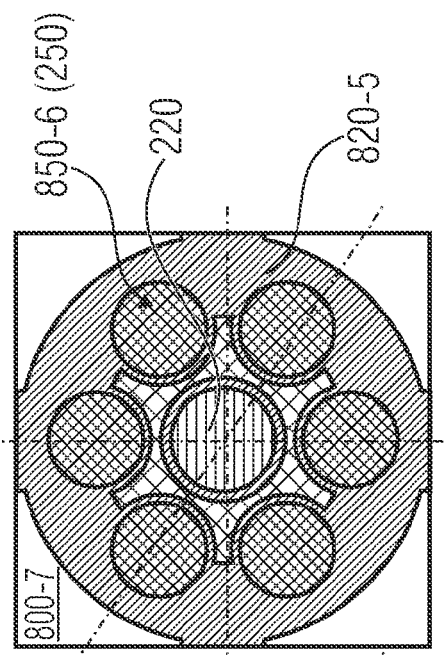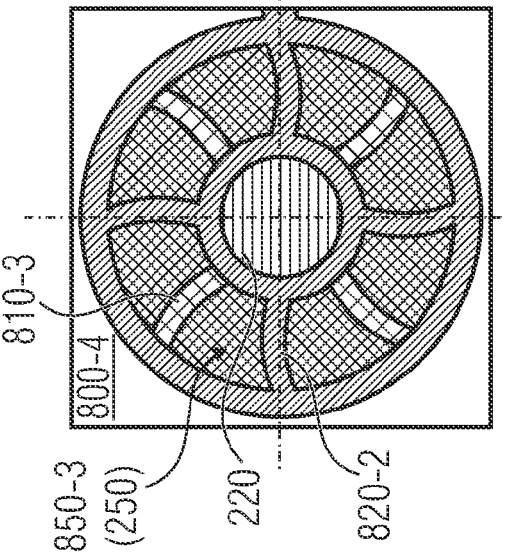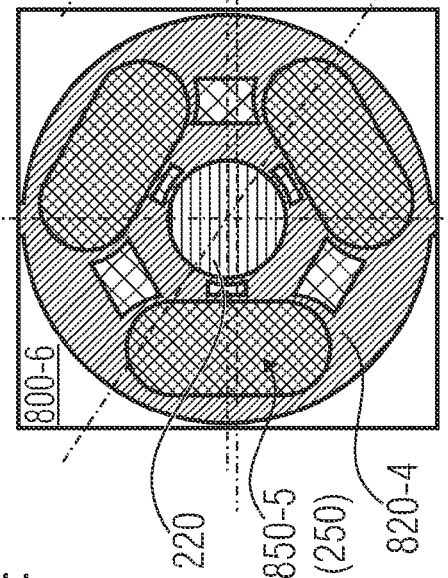

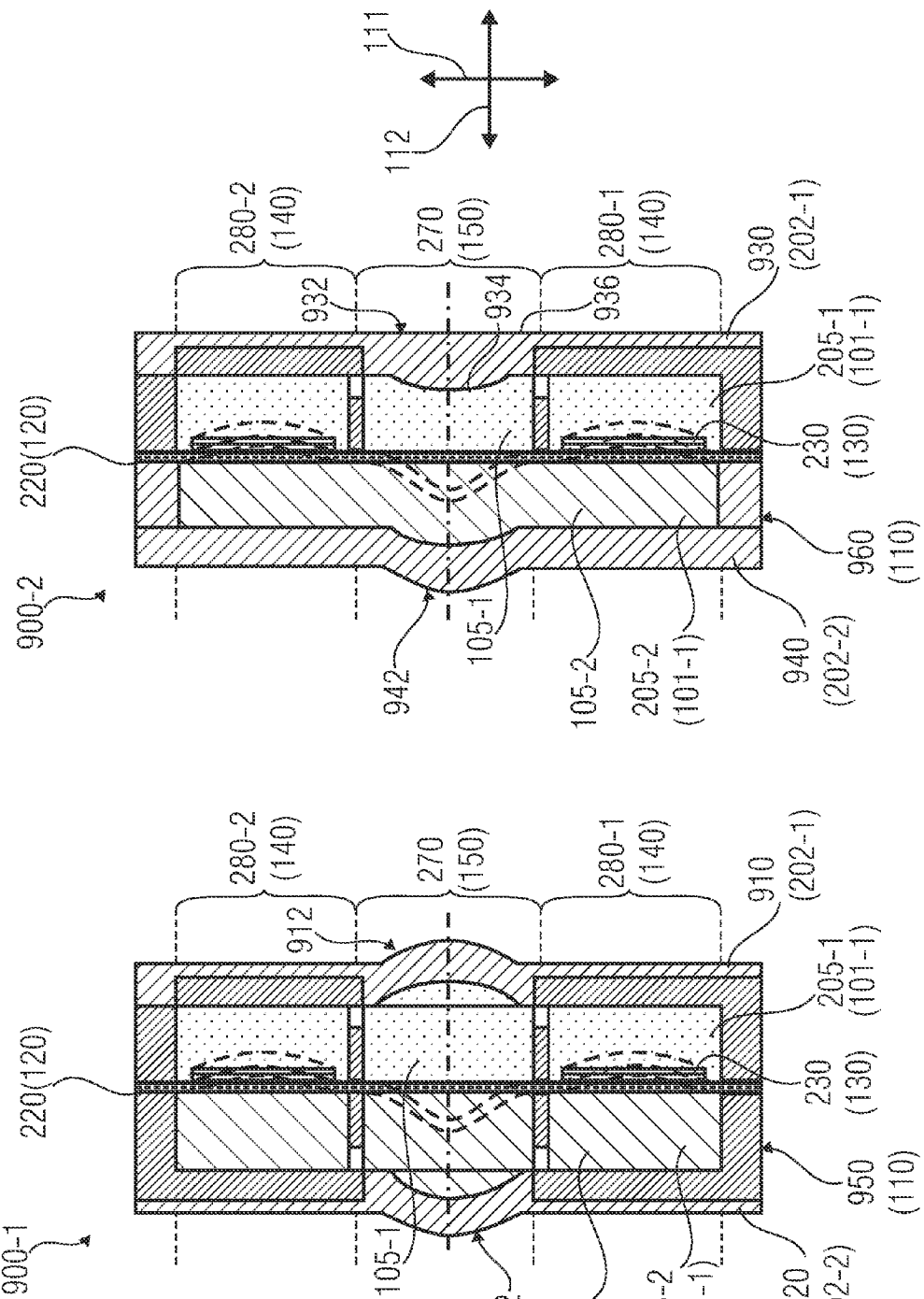

FLUIDIC VARIABLE FOCAL LENGTH OPTICAL LENS AND METHOD FOR MANUFACTURING THE SAME

CROSS-REFERENCE TO RELATED APPLICATIONS

This application is a continuation of copending International Application No. PCT/EP2010/060496, filed Jul. 20, 2010, which is incorporated herein by reference in its entirety.

BACKGROUND OF THE INVENTION

The present invention relates to a fluidic variable focal length optical lens and a method for manufacturing the same.

There is an ever-increasing need for miniaturization and cost-effective solutions for lenses as part of imaging systems with either static or dynamic functions. In conventional optical imaging systems and cameras with auto-focus and zooming options, the physical positioning of a movable lens element to focus an image onto an image sensor or to change the overall magnification of the system is often realized by a manual operation of a bulky mechanical positioning system based on a complex arrangement of gears. The large physical dimension of a focusing and zooming system makes it difficult to place such optical zooming functions onto cell phone cameras or, if this is done nevertheless, the image quality is low compared to that of conventional photo cameras. Moreover, mechanical positioning systems are subjected to corrosion or mechanical wearing processes such as abrasion.

In order to improve the functionalities, increase the efficiency and decrease the costs of a zoom objective, an auto-focus option or other (adjustable) optical element for miniature imaging systems, alternative solutions have been adopted, including lenses of continuously varying focal length.

In the art, known design of variable lenses employed for optical imaging and adaptive optics make use of various fundamental processes for varying the focal length, wherein the basic idea is to either change the geometry or the optical properties of the lens material. Known designs of variable lenses use, for instance, processes such as a deformation of an elastic membrane as provoked by an externally exerted hydraulic pressure on the surrounding medium, the variation of contact angle respectively meniscus of a two-fluid-interface forming a lens by means of electro-wetting effect, volume variation of lens materials via thermal contraction respectively dilation or pH variation in organic gels' lenses, refractive index variation in lenses made of liquid crystals by electrically changing the liquid crystals' orientation, lenses made of electro-optic materials whose bulk polarization can be changed by varying an applied electric field, and lenses made of thermo-optic materials which respond to temperature variation.

In WO 2007/069213 A2, U.S. Pat. No. 6,188,526 B1, J. Draheim et al., "Fabrication of a fluidic membrane lens system", J. Micromech. Microeng. 19 (2009) 095013 and U.S. Pat. No. 7,580,195 B2, several different focus fluid lens devices having a fluidic chamber are described, wherein a membrane is deformed by an activation of some actuator configured to act as a pump so as to change a focal length of the respective lens device. In WO 2007/069213 A2, the actuator has two distinct states of deformation only, which essentially result in two different focal lengths as well. In U.S. Pat. No. 6,188,526 B1, a pump zone and a lens zone of the fluidic chamber laterally overlap each other, so that the construction is complicated. A disadvantage of the lens device as described in J. Draheim et al., "Fabrication of a fluidic membrane lens system", J. Micromech. Microeng. 19 (2009) 095013 is that it uses channels and, therefore, is characterized by a relative complex structure. In U.S. Pat. No. 7,580,195 B2, the structure of the lens device has one fluidic chamber filled with a fluidic medium with the membrane separating the fluidic medium from the environmental medium, so that the control of the focal length is difficult due to dependencies on environmental physical conditions.

However, a general problem of known designs is that they present restrictions regarding the degree of miniaturization, compactness and robustness.

SUMMARY

According to an embodiment, a fluidic variable focal length optical lens may have a sealed housing having a first fluidic chamber filled with a first fluidic medium and a second fluidic chamber filled with a second fluidic medium, the first and the second fluidic chamber being separated from each other by an elastic membrane, wherein the first and the second fluidic medium have different refractive indices; a deformator configured to deform the elastic membrane laterally within a pump zone, thereby laterally displacing the first fluidic medium from the pump zone to a lens zone and the second fluidic medium from the lens zone to the pump zone along a lateral direction, wherein the lateral direction is parallel to a longer side of the sealed housing, so that the elastic membrane also deforms in the lens zone and changes a focal length of the lens zone along a normal direction; wherein the pump zone is formed by a first portion of the first fluidic chamber and the second fluidic chamber, where the first and the second fluidic medium are separated from each other by a combination of the elastic membrane and the deformator; wherein the lens zone is formed by a second portion of the first fluidic chamber and the second fluidic chamber, where the first and the second fluidic medium are separated from each other by the elastic membrane; wherein the first fluidic chamber has a lower support structure for supporting the elastic membrane at a junction between the pump zone and the lens zone, and wherein, in a deactivated state of the deformator, the elastic membrane lies on the lower support structure, and, in an activated state of the deformator, the elastic membrane is deformed in the pump zone into a direction pointing away from the second fluidic chamber with the elastic membrane resting on the lower support structure bending toward the second fluidic chamber within the lens zone; and wherein the second fluidic chamber has an upper support structure, and wherein, in the deactivated state of the deformator, the elastic membrane is fixed between the lower support structure and the upper support structure in a fixing region of the elastic membrane, so that, in the activated state of the deformator, a deformation of the elastic membrane in the fixing region is reduced.

According to another embodiment, a method for manufacturing a fluidic variable focal length optical lens may have the steps of providing a housing having a first fluidic chamber and a second fluidic chamber, the first and the second fluidic chamber being separated from each other by an elastic membrane, and a deformator configured to deform the elastic membrane laterally within the pump zone; filling the first fluidic chamber with a first fluidic medium and the second fluidic chamber with a second fluidic medium, wherein the first and the second fluidic medium have different refractive indices; and sealing the housing, wherein the deformator is configured to deform the elastic membrane laterally within the pump zone, so that the first fluidic medium is laterally displaced from the pump zone to a lens zone and the second fluidic medium from the lens zone to the pump zone along a lateral direction, wherein the lateral direction is parallel to a longer side of the sealed housing, so that the elastic membrane also deforms in the lens zone and changes a focal length of the lens zone along a normal direction; wherein the pump zone is formed by a first portion of the first fluidic chamber and the second fluidic chamber, where the first and the second fluidic medium are separated from each other by a combination of the elastic membrane and the deformator; wherein the lens zone is formed by a second portion of the first fluidic chamber and the second fluidic chamber, where the first and the second fluidic medium are separated from each other by the elastic membrane; wherein the first fluidic chamber has a lower support structure for supporting the elastic membrane at a junction between the pump zone and the lens zone, and wherein, in a deactivated state of the deformator, the elastic membrane lies on the lower support structure, and, in an activated state of the deformator, the elastic membrane is deformed in the pump zone into a direction pointing away from the second fluidic chamber with the elastic membrane resting on the lower support structure bending toward the second fluidic chamber within the lens zone; and wherein the second fluidic chamber has an upper support structure, and wherein, in the deactivated state of the deformator, the elastic membrane is fixed between the lower support structure and the upper support structure in a fixing region of the elastic membrane, so that, in the activated state of the deformator, a deformation of the elastic membrane in the fixing region is reduced.

According to an embodiment of the present invention, the fluidic variable focal length optical length comprises a sealed housing and a deformator. The sealed housing comprises a first fluidic chamber filled with a first fluidic medium and a second fluidic chamber filled with a second fluidic medium. Here, the first and the second fluidic chamber are separated from each other by an elastic membrane, wherein the first and the second fluidic medium have different refractive indices. The deformator is configured to deform the membrane laterally within a pump zone, thereby laterally displacing the first fluidic medium from the pump zone to a lens zone and the second fluidic medium from the lens zone to the pump zone, so that the membrane also deforms in the lens zone and changes a focal length of the lens zone along a normal direction.

The basic idea underlying the present invention is that the above-mentioned compact, robust and flexible design can be achieved when a sealed housing is provided comprising a first fluidic chamber and a second fluidic chamber, the first and the second fluidic chamber being separated from each other by an elastic membrane, and a deformator configured to deform the membrane laterally within a pump zone, wherein the first and the second fluidic chamber are filled with the first and the second fluidic medium, respectively, wherein the first and the second fluidic medium having different refractive indices. The deformator is configured to deform the membrane laterally within the pump zone, so that the first fluidic medium is laterally displaced from the pump zone to a lens zone and accordingly the second fluidic medium from the lens zone to the pump zone, so that the membrane also deforms in the lens zone and changes a focal length of the lens zone along a normal direction. By this measure, restrictions regarding the miniaturization, compactness and robustness may be overcome, thereby realizing an improved concept of a robust and compact fluidic variable focal length optical lens system.

The thus obtained fluidic variable focal length optical lens especially represents a closed system formed by the sealed housing, wherein the two fluidic chambers can be filled with two different (arbitrary) fluidic media. An advantage of such a closed system is that it is relatively robust and can therefore resist or be independent of external variations/surrounding conditions such as pressure variations and/or temperature variations acting on same. Therefore, the fluidic variable focal length optical lens can be adjusted more easily and more reliably.

According to a further embodiment, the first fluidic chamber comprises a lower support structure for supporting the membrane at a junction between the pump zone and the lens zone. Here, in a deactivated state of the deformator, the membrane lies on the lower support structure, and, in an activated state of the deformator, the membrane is deformed in the pump zone into a direction pointing away from the second fluidic chamber with the membrane resting on the lower support structure bending toward the second fluidic chamber within the lens zone. In this way, a continuous bending of the membrane induced by activating the deformator can be achieved, which results in a variable strength of the fluidic variable focal length optical lens as represented by a corresponding change of curvature of a lens surface formed by the membrane.

According to a further embodiment, the deformator is configured as a ring-shaped isotropically deforming actuator extending within the pump zone and the pump zone laterally surrounds the lens zone. This configuration ensures a more efficient deformation of the deformator in the pump zone, thereby optimizing a radial displacement of the first and the second fluidic medium between the pump zone and the lens zone. As a result, the focal length in the lens zone can be changed in a more efficient way.

According to a further embodiment, the sealed housing comprises two opposing substrate portions extending within the lens zone, at least one of which is configured as a fixed lens having a predefined shape. By this measure, a lens effect depending on the deformation of the membrane within the lens zone can controllably be increased.

According to a further embodiment, a method for manufacturing a fluidic variable focal length optical lens comprises a housing comprising a first fluidic chamber and a second fluidic chamber, the first and the second fluidic chamber being separated from each other by an elastic membrane, and a deformator configured to deform the membrane laterally within a pump zone, filling the first fluidic chamber with the first fluidic medium and the second fluidic chamber with the second fluidic medium, wherein the first and the second fluidic medium have different refractive indices, and sealing the housing, wherein the deformator is configured to deform the membrane laterally within the pump zone, so that the first fluidic medium is laterally displaced from the pump zone to a lens zone and the second fluidic medium from the lens zone to the pump zone, so that the membrane also deforms in the lens zone and changes a focal length of the lens zone along a normal direction.

According to a further embodiment, the step of filling is performed in that the first and the second fluidic chamber are filled synchronously or one after the other, wherein a pressure difference between the first and the second fluidic chamber is controllable. This allows the membrane to remain in a same state of deformation during the filling process.

BRIEF DESCRIPTION OF THE DRAWINGS

Embodiments of the present invention will be detailed subsequently referring to the appended drawings, in which:

FIG. 1a is a principle sketch of an embodiment of a fluidic variable focal length optical lens with a pump zone and a lens zone in a deactivated state ('off'-state) of a deformator;

FIG. 1b is a principle sketch of an embodiment of a fluidic variable focal length optical lens with a pump zone and a lens zone in an activated state ('on'-state) of a deformator;

FIG. 8a is a side view of an exemplary design of a fluidic variable focal length optical lens;

FIG. 8b is a top view of a lens section of the exemplary design of the fluidic variable focal length optical lens in accordance with FIG. 8a, illustrating an embodiment of an actuator and a fluidic unit body design;

FIG. 8c is a top view of a lens section of the exemplary design of the fluidic variable focal length optical lens in accordance with FIG. 8a, illustrating a further embodiment of an actuator and a fluidic unit body design;

FIG. 8d is a top view of a lens section of the exemplary design of the fluidic variable focal length optical lens in accordance with FIG. 8a, illustrating a further embodiment of an actuator and a fluidic unit body design;

FIG. 8e is a top view of a lens section of the exemplary design of the fluidic variable focal length optical lens in accordance with FIG. 8a, illustrating a further embodiment of an actuator and a fluidic unit body design;

FIG. 8f is a top view of a lens section of the exemplary design of the fluidic variable focal length optical lens in accordance with FIG. 8a, illustrating a further embodiment of an actuator and a fluidic unit body design;

FIG. 8g is a top view of a lens section of the exemplary design of the fluidic variable focal length optical lens in accordance with FIG. 8a, illustrating a further embodiment of an actuator and a fluidic unit body design;

FIG. 9a is a side view of an embodiment of a fluidic variable focal length optical lens with two fluidic chambers and two substrate portions of a sealed housing, each of which being configured as a fixed lens;

FIG. 9b is a side view of a further embodiment of a fluidic variable focal length optical lens with two fluidic chambers and two substrate portions of a sealed housing, each of which being configured as a fixed lens;

DETAILED DESCRIPTION OF THE INVENTION

Figure 2A:
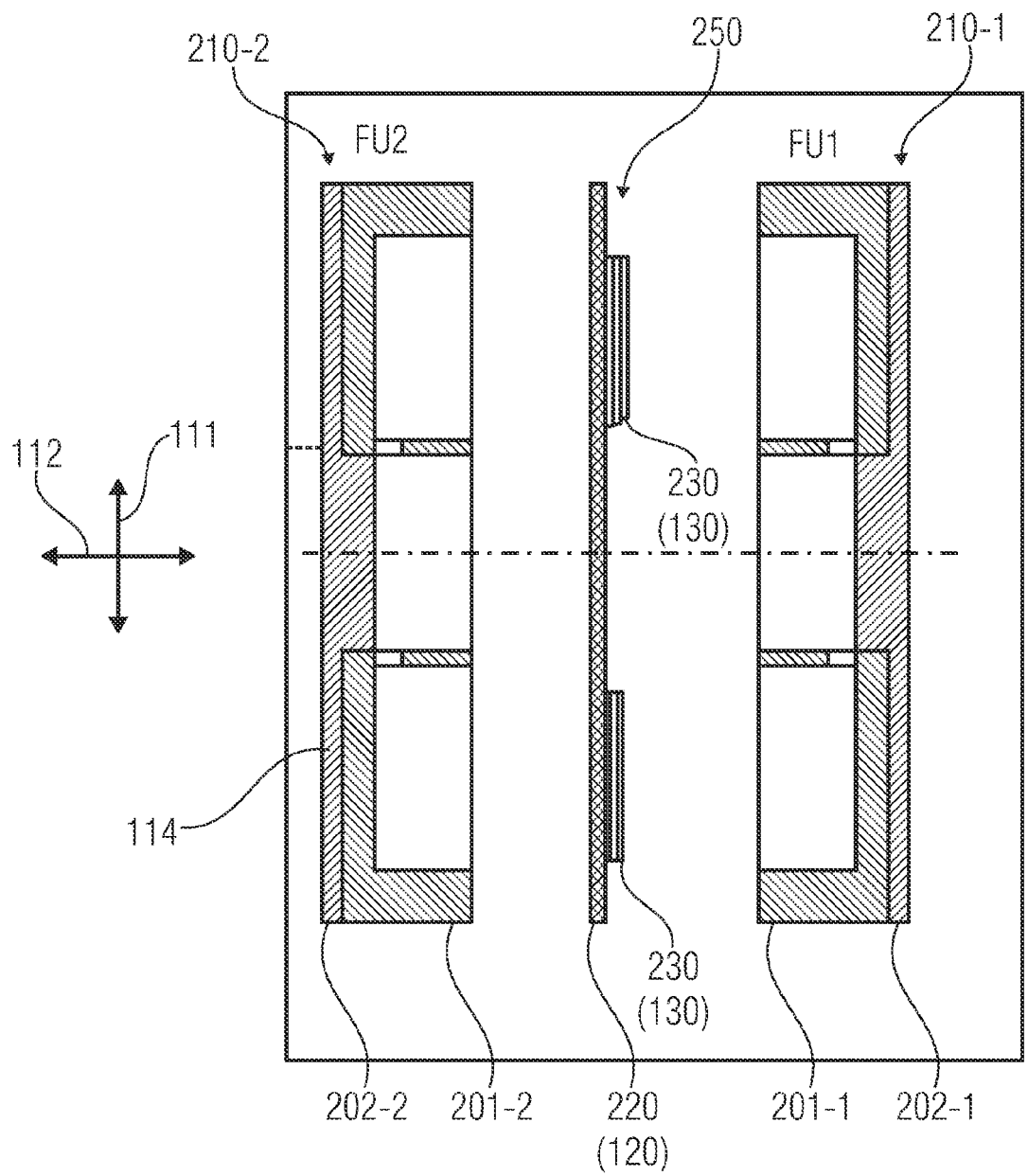
FIG. 2a is a side view of parts of an embodiment of a fluidic variable focal length optical lens in the form of two fluidic chamber units and a combination of a membrane and an actuator.

The following provides a detailed description of the present invention in the context of a fluidic variable focus lens system, methods of fabrication, fluid filling solutions and usage of the lens and optical devices, which include the lens.

FIGS. 1a; 1b show a principle sketch of embodiments of a fluidic variable focal length optical lens 100-1; 100-2 with a pump zone and a lens zone in a deactivated state ('off'-state) or an activated state ('on'-state) of a deformator, respectively. As shown in FIGS. 1a; 1b, the respective fluidic variable focal length optical lens 100-1; 100-2 comprises a sealed housing 110 and a deformator 130. The sealed housing 110 comprises a first fluidic chamber 101-1 filled with a first fluidic medium 105-1 and a second fluidic chamber 101-2 filled with a second fluidic medium 105-2. Here, the first fluidic chamber 101-1 and the second fluidic chamber 101-2 are separated from each other by an elastic membrane 120 in a lens zone 150 and a combination of the or another elastic membrane 120 and the deformator/actuator 130 in a pump zone 140, wherein the first 105-1 and the second fluidic medium 105-2 have different refractive indices. The deformator 130 is configured to deform the membrane 120 laterally within a pump zone 140, thereby laterally displacing the first fluidic medium 105-1 from the pump zone 140 to a lens zone 150 and the second fluidic medium 105-2 from the lens zone 150 to the pump zone 140, so that the membrane 120 also deforms in the lens zone 150 and changes a focal length of the lens zone 150 along a normal direction.

In FIGS. 1a; 1b, the first fluidic medium 105-1 is denoted by 'working medium 1' and the second fluidic medium 105-2 is denoted by 'working medium 2'. Moreover, the lateral displacement of the first and the second fluidic medium 105-1, 105-2 between the pump zone 140 and the lens zone 150 is essentially along a lateral direction 111, while the change of focal length is along a normal direction 112. As can be seen in FIGS. 1a; 1b, the lateral direction 111 is defined as a direction parallel to a longer side 114 of the sealed housing 110, while the normal direction 112 is defined as a direction perpendicular to the longer side 112 of the sealed housing 110.

The difference between the embodiments of FIGS. 1a; 1b is that in FIG. 1a, the fluidic variable focal length optical lens 100-1 is in its off-state, wherein light beams indicated by arrows 113 may pass through the two fluidic chambers 105-1, 105-2 in the lens zone 150 without a deflection, while in FIG. 1b, the fluidic variable focal length optical lens 100-2 is in its on-state, wherein the light beams 113 may be deflected onto a focal point P induced by the deformation of the membrane 120 in the lens zone 150.

FIG. 2a shows a side view of parts 200-1 of an embodiment of a fluidic variable focal length optical lens in the form of two fluidic chamber units and a combination of a membrane and an actuator. Referring to FIG. 2a, the parts 200-1 of the fluidic variable focal length optical lens comprise two fluidic chamber units 210-1, 210-2 denoted by 'FU1', 'FU2' and a combination 250 of a membrane 220 and an actuator 230. The membrane 220 and the actuator 230 of FIG. 2a may correspond to the elastic membrane 120 and the deformator 130 of FIG. 1. In FIG. 2a, each of the two fluidic chamber units 210-1, 210-2 consists of a fluidic unit body 201-1, 201-2 and a substrate 202-1, 201-2. Here, the fluidic unit bodies 201-1, 201-2 are attached to the respective substrates 202-1, 202-2, which can be made of a transparent material in an optical spectral range of interest and structured along the optical path.

Figure 2B:
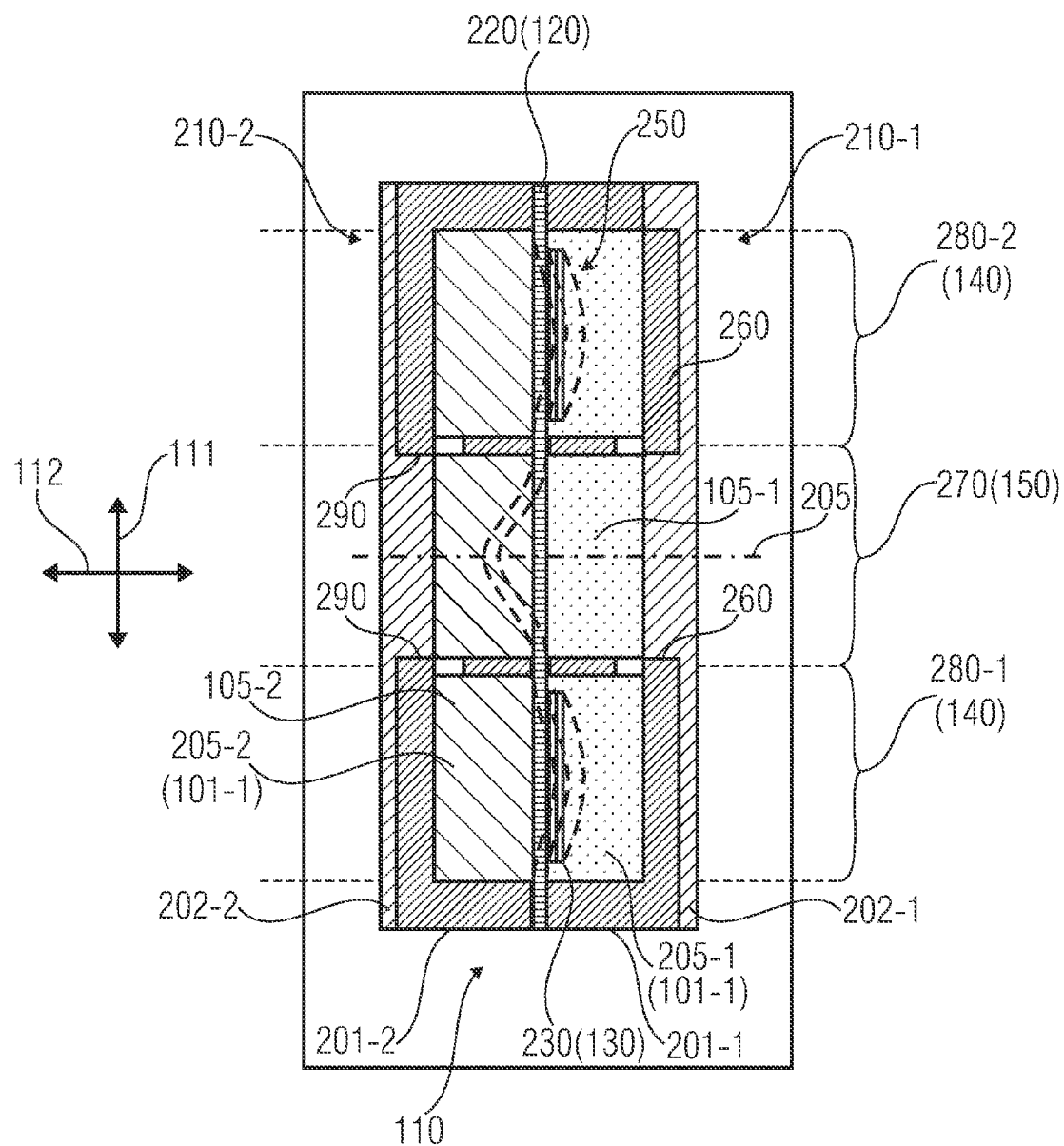
FIG. 2b is a side view of an assembly of the parts of the embodiment of the fluidic variable focal length optical lens in accordance with FIG. 2a, containing two fluidic media in an activated/deactivated state ('on'/'off' working positions) of the actuator.

FIG. 2b shows a side view of an assembly 200-2 of the parts 200-1 of the embodiment of the fluidic variable focal length optical lens in accordance with FIG. 2a. The assembly 200-2 represents a fluidic variable focal length optical lens comprising the sealed housing 110 and the combination 250 of the membrane 220 and the actuator 230. As can be seen in FIG. 2b, the sealed housing 110 together with the combination 250 of the membrane 220 and the actuator 230 define a first fluidic chamber 205-1 and a second fluidic chamber 205-2. Here, the first and the second fluidic chamber 205-1, 205-2 of FIG. 2b may correspond to the first and the second fluidic chamber 101-1, 101-2 of FIGS. 1a; 1b. As can be seen in FIG. 2b, the first fluidic chamber 205-1 may be filled with the first fluidic medium 105-1 as indicated by a dotted area, while the second fluidic chamber 205-2 may be filled with the second fluidic medium 205-2 as indicated by a shaded area. The first fluidic unit body 201-1 of the first fluidic chamber unit 210-1 constitutes a lower support structure 260 within the first fluidic chamber 205-1. Here, by the indications 'lower' and 'upper' support structure, respectively, it is referred to a situation, wherein the fluidic variable focal length optical lens is positioned such that the second fluidic chamber 205-2 lies above the first fluidic chamber 205-1, the gravity acting in a direction pointing from the upper second fluidic chamber 205-2 to the lower first fluidic chamber 205-1. In the FIG. 2b embodiment, the fluidic variable focal length optical lens 200-2 has a central lens zone 270, which may correspond to the lens zone 150 of FIG. 1, and two laterally surrounding pump zones 280-1, 280-2, which may correspond to the pump zone 140 of FIGS. 1a; 1b. The lateral direction 111 and the normal direction 112 are defined as in the FIGS. 1a; 1b embodiments.

The lower support structure 260 of FIG. 2b is configured for supporting the membrane 220 at a junction between the pump zones 280-1, 280-2 and the lens zone 270. In particular, in a deactivated state of the deformator or actuator 230, the membrane 220 lies on the lower support structure 260, and, in an activated state of the deformator or actuator 230, the membrane 220 is deformed in the pump zone 280-1, 280-2 into a direction pointing away from the second fluidic chamber 205-2 with the membrane 220 resting on the lower support structure 260 bending toward the second fluidic chamber 205-2 within the lens zone 270. Referring to FIG. 2b, a resting state of the membrane 220 corresponding to the deactivated state of the actuator 230 is represented by solid lines, while a deformation state of the membrane 220 corresponding to the activated state of the actuator 230 is represented by broken lines.

According to a further embodiment of the present invention, the second fluidic unit body 201-2 of the second fluidic chamber unit 210-2 may constitute an upper support structure 290 within the second fluidic chamber 205-2. Here, in the deactivated state of the actuator 230, the membrane 220 will be fixed between the lower support structure 260 and the upper support structure 290.

According to a further embodiment of the present invention, the sealed housing 110 may be arranged to fix the membrane 220 along a circular line with the pump zones 280-1, 280-2 laterally surrounding the lens zone 270, which is in the centre of the circular line.

In particular, the deformator or actuator 230 may be configured in a three-dimensional geometry as a ring-shaped isotropically deforming actuator extending within the pump zones 280-1, 280-2, wherein the pump zones 280-1, 280-2 laterally surround the lens zone 270. The activation/deactivation of the actuator 230 in the FIG. 2b embodiment provides an internal pump mechanism, wherein the fluidic media 105-1, 105-2 are pumped back and forth essentially parallel to the lateral direction 111 inside the fluidic chamber units 210-1, 210-2, so that the elastic membrane 220 being in contact with the fluidic media 105-1, 105-2 will be deformed. Here, an isotropic deformation of the actuator may be advantageous in that a higher efficiency of the displacement of the fluidic media 105-1, 105-2 between the pump zones 280-1, 280-2 and the lens zone 270 will be obtained. Specifically, the fluidic chamber units 210-1, 210-2 are connected and are coupled via the combination 250 or an arrangement consisting of the membrane 220 and the actuator 230 acting as a pump, which is electrically addressable (electromechanically active).

Figure 3:
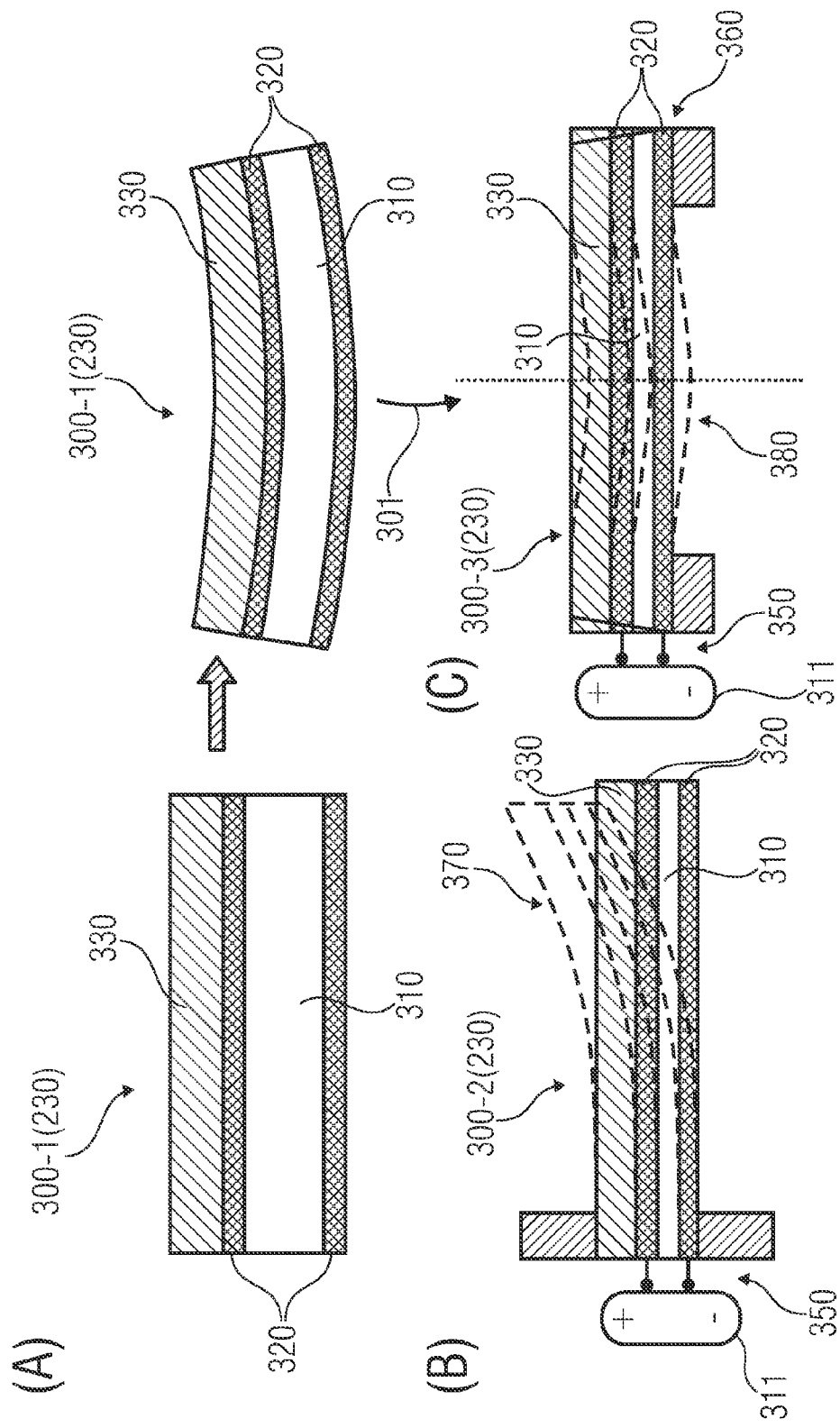
FIG. 3a illustrates a principle deformation of an embodiment of a deformator configured as a stack of electrostrictive and elastic layers in a free-standing configuration.
FIG. 3b illustrates a principle deformation of a further embodiment of a deformator configured as a stack of electrostrictive and elastic layers when fixed at one end.
FIG. 3c illustrates a principle deformation of a further embodiment of a deformator configured as a stack of electrostrictive and elastic layers when fixed at both ends.

FIGS. 3a; 3b; 3c illustrate a principal deformation of different embodiments of a deformator configured as a stack 300-1; 300-2; 300-3 of electroactive and elastic layers in different configurations. The stack 300-1; 300-2; 300-3 of electroactive and elastic layers respectively deformable layer element shown in FIGS. 3a; 3b; 3c may correspond to the actuator 230 shown in FIGS. 2a; 2b. In particular, the isotropically deforming actuator 230 may be electrically activated comprising one or more electroactive deformable layers 310. As shown in FIGS. 3a; 3b; 3c, the one or more electroactive deformable layers 310 are sandwiched between conductive layers 330 to form the respective layer stack 300-1; 300-2; 300-3. The respective layer stack 300-1; 300-2; 300-3 may be attached to the membrane 220 via an elastic layer 330.

In the free-standing configuration of FIG. 3a, the stack 300-1 will bend essentially along a direction 301 pointing away from the elastic layer 330 when electrically activated. As shown in FIGS. 3b; 3c, the stacks 300-2; 300-3 may also be fixed at one end 350 or at both ends 350, 360. Here, the deactivated state of the stacks 300-2; 300-3 is indicated by solid lines, while the activated state of the stacks 300-2; 300-3 is indicated by broken lines. It can be seen in FIGS. 3b; 3c that in response to an application of a voltage 311 to the conductive layers 320, the stacks 300-2; 300-3 will essentially deform in regions 370; 380 only, where they are not fixed and thus bendable.

Specifically, applying an electric field across the electroactive layer 310 will provoke its internal deformation and, due to a subsequently induced stress, an appropriate squeezing of the elastic layer 330 will occur, so that the layer stack 300-1; 300-2; 300-3 will bend. Here, the elastic layer 330 is configured to be passive, while the electroactive deformable layers 310 of the stacks 300-1; 300-2; 300-3 are configured to be active. In other words, FIGS. 3a; 3b; 3c exemplarily show the principal deformation (stroke) of the respective stack 300-1; 300-2; 300-3, each containing one electrostrictive layer 310 sandwiched between two conductive layers 320 (electrodes) and an elastic layer 330. The respective stack 300-1; 300-2; 300-3 is either free-standing (FIG. 3a), fixed at one end (FIG. 3b) or fixed at both ends (FIG. 3c).

Referring to FIG. 2b, the actuator 230 or the electroactive or electromechanically active deformable layer element may have its ends fixed at bordering regions of the support structure 260 between the fluidic chamber units 210-1, 210-2. Upon electrical activation, the actuator 230 will deform respectively bend and induce a hydraulic pressure on the first fluidic medium 105-1 within the first fluidic chamber 205-1. As a result, the first fluidic medium 105-1 is compressed and pushed against the elastic membrane 220, which will form a curvature deviating from a flat shape. The second fluidic medium 105-2 in the second fluidic chamber 205-2 will also be displaced. In the particular case that the fluidic media are liquids, the volume of the entire system may be kept constant.

In embodiments of the present invention, the one or more electroactive deformable layers 310 or the electromechanically active layers of the actuator 230 are made of an electroactive material, such as a piezoelectric and/or an electrostrictive material, each of which are sandwiched between the conductive layers 320. In particular, the conductive layers 320 play the role of ground and counter electrodes. The deformation of the one or more electroactive deformable layers 310 can be activated by applying an external field between the electrodes, thus inducing the reverse piezoelectric effect or the electrostrictive effect. The just-mentioned effect states that an applied external electric field induces strain and/or stress in some materials resulting in a mechanical deformation.

In the electrostrictive effect, the intrinsic strain respectively deformation induced by an external field in the material increases quadratically with the electric field. The electrostrictive effect occurs in all dielectric materials although it is usually too small to utilize. However, there are inorganic as well as ceramic and organic materials which possess high enough electrostrictive coefficients, so that the quadratic increase of the deformation with the applied electric field will be significant. For instance, piezoelectric ceramics (e.g. PZT, lead zirconate titanate) with the highest piezoelectric coefficients of 300 to 600 pm/V can accomplish a maximum strain of 0.2%, while for piezoelectric polymers with moderate piezoelectric coefficients of about 30 pm/V, the maximum achievable strain is 0.1%. As a comparison, the electrostrictive fluoropolymer PVDF-TrFE-CFE (68/32/9 mol %) with electrostrictive coefficients of about $10^6$ $pm^2/V^2$ can reach a maximum strain of about 7%. Owing to their high strain as well as on-chip integration compatibility, the electrostrictive polymers may advantageously be used as active materials in the embodiments of the present invention. According to further embodiments, the actuator 230 may also be designed including alternating oppositely poled electroactive layers. Yet according to further embodiments, ionized polymer-metal composites (IPMC) may be used for the one or more electroactive deformable layers 310.

The deformation induced by the electrostrictive effect occurs isotropically across the electrostrictive layer plane. Layers made of electrostrictive materials could be used in designing bending actuators wherein they may be combined in a stack with other layers of different geometry or physical properties. Also various layer stack fixing modalities may be employed to obtain a bending deformation. For instance, some designs may combine active layers from the same material but of different thickness, or active layers sandwiched between electrodes of different thickness, or active layers stacked with passive layers of different elastic modules.

Figure 4A:
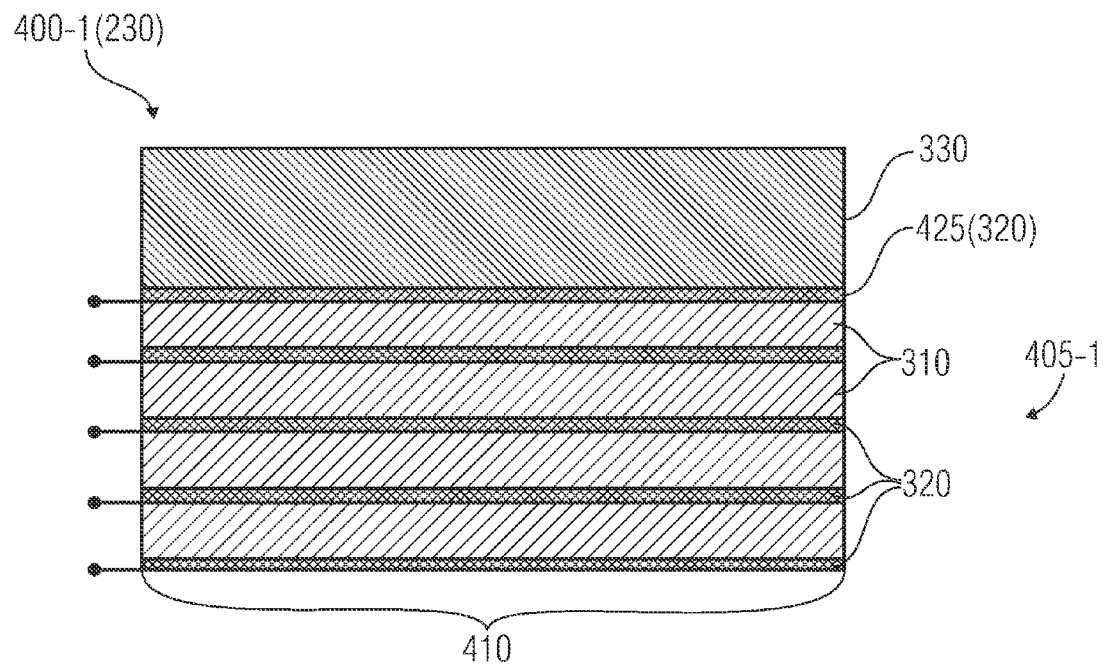
FIG. 4a is a further embodiment of a deformator configured as a basic electrostrictive layered stack with an active area.

As the deformation of the actuator increases with the number of active layers in the layer stack, a higher deformation at a constant applied electric field will be obtained for a stack containing multiple electroactive layers. Specifically, FIGS. 4a; 4b show further embodiments of different actuators configured as basic electrostrictive layered stacks 400-1; 400-2 comprising active and/or passive areas. As shown in FIG. 4a, the electroactive layered stack 400-1 may have a first electrode configuration 405-1 comprising a plurality of electroactive deformable layers 310, each sandwiched between the conductive layers 320, wherein the at least one elastic layer 330 is attached to an uppermost conductive layer 425, and wherein the conductive layers 320 extend over a maximum dimension 410 of the electroactive deformable layers 310 corresponding to an active area.

Figure 4B:
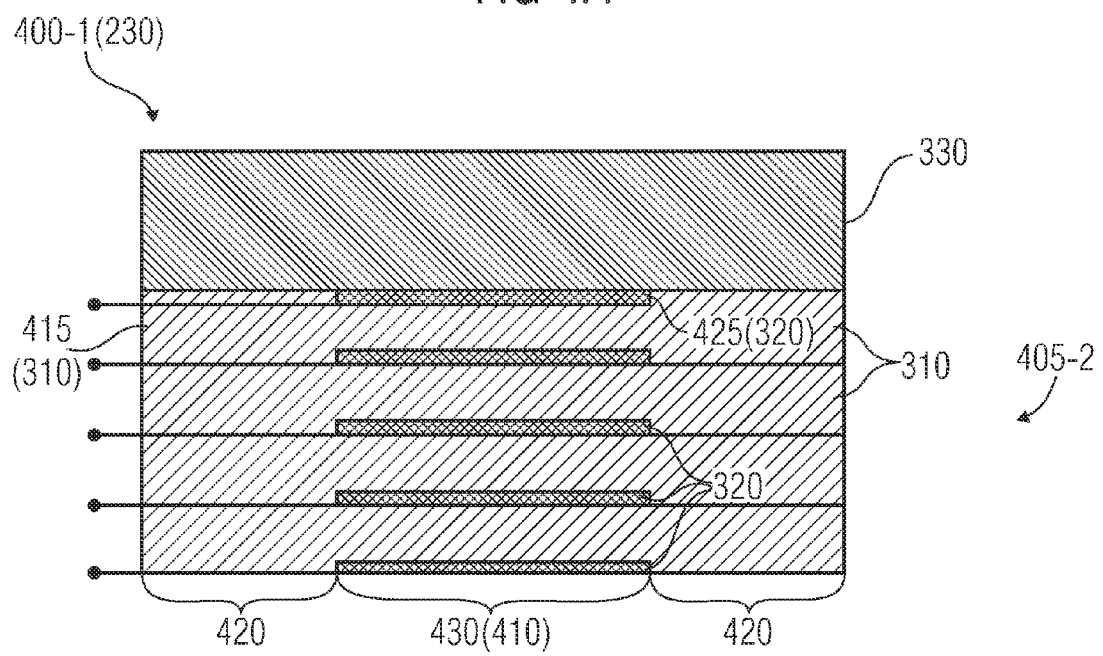
FIG. 4b is a further embodiment of a deformator configured as a basic electrostrictive layered stack with passive and active areas.

In FIG. 4b, the electroactive layered stack 400-2 also comprises the plurality of electroactive deformable layers 310, each sandwiched between the conductive layers 320. Here, however, the at least one elastic layer 330 is partially attached to the uppermost conductive layer 425 and an uppermost electroactive deformable layer 415. Moreover, the conductive layers 320 extend only partially across an active area 430, so that passive areas 420 are formed. Therefore, the actuator 230 may comprise active and passive areas (see FIGS. 4a; 4b). By using an appropriate electrode configuration, the actuator deformation as well as its bending direction can be controlled.

According to further embodiments, the actuator may comprise thin layers of electrostrictive polymers with high electrostrictive constants such as PVDF-TrFE-CFE (polyvinylidene fluoride-trifluoroethylene-1,1'-chlorofluoroethylene), PVDF-TrFE-HFD (polyvinylidene fluoride-trifluoroethylene-hexafluoropropene), PVDF-TrFE-CTFE (polyvinylidene fluoride-trifluoroethylene-chlorotrifluoroethylene) etc. The P(VDF-TrFE-CFE)-terpolymer exhibits high electrostrictive strain (≈7%) for an applied electric field of about 150 V/μm.

Figure 5:
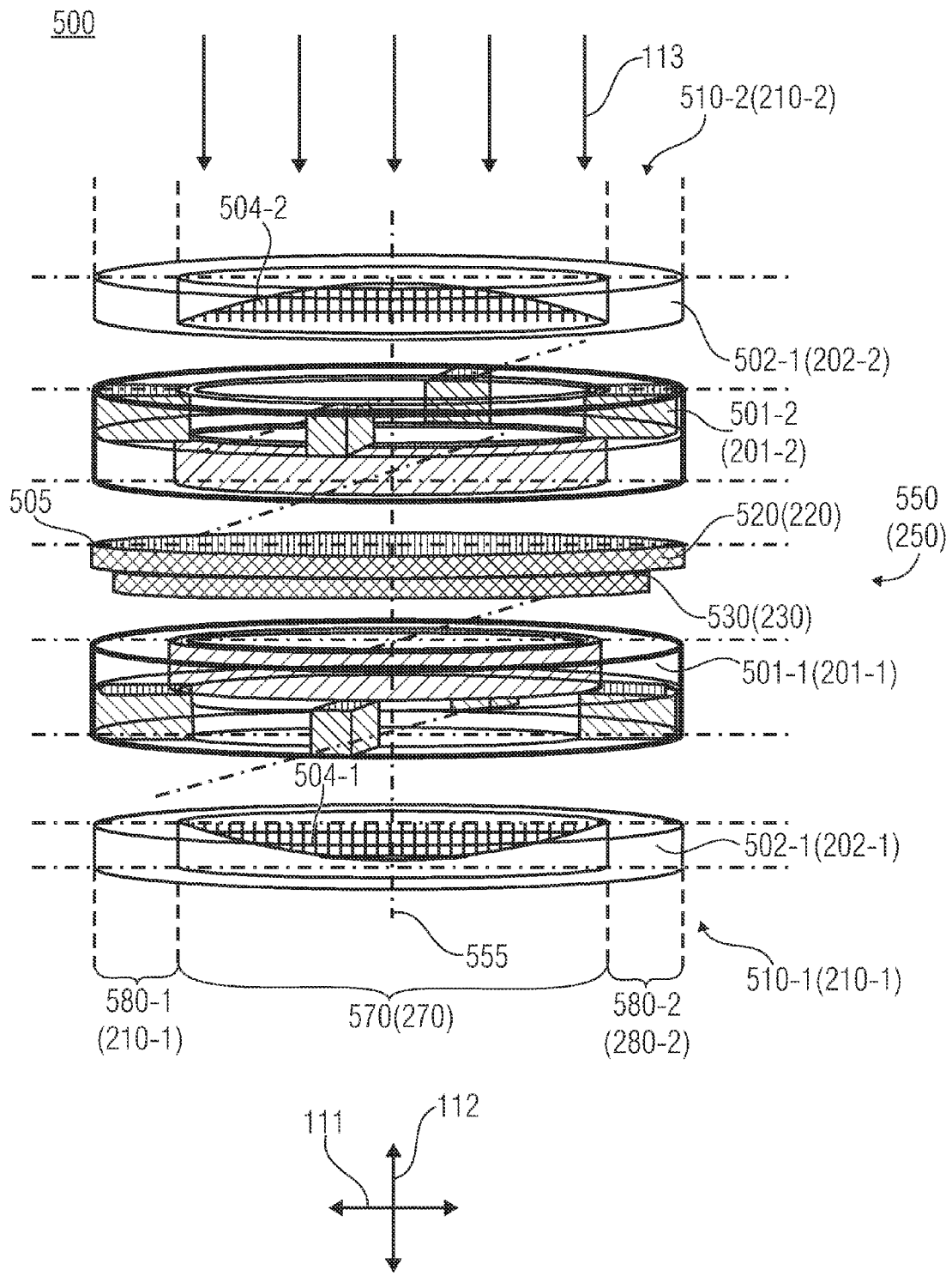
FIG. 5 is a perspective view of an assembly of a further embodiment of a fluidic variable focal length optical lens.

FIG. 5 shows a perspective view of an assembly 500 of a further embodiment of a fluidic variable focal length optical lens. In the embodiment of FIG. 5, the lens assembly 500, consisting of two fluidic chamber units 510-1, 510-2, is displayed. In particular, the lens assembly 500 has a compact design, which includes a first and a second fluidic unit body 501-1, 501-2, a first and a second substrate 502-1, 502-2 and a combination 550 of an elastic membrane 520 and an actuator 530. Here, the two fluidic chamber units 510-1, 510-2, the first and the second fluidic unit bodies 501-1, 501-2, the first and the second substrate 502-1, 502-2 and the combination 550 of the elastic membrane 520 and the actuator 530 shown in FIG. 5 may correspond to the two fluidic chamber units 210-1, 210-2, the first and the second fluidic unit bodies 201-1, 201-2, the first and the second substrate 202-1, 202-2 and the combination 250 of the elastic membrane 220 and the actuator 230 shown in FIG. 2b. When all the parts of the lens assembly 500 are stacked together, a sealed housing may be formed so as to fix the membrane 520 along a circular line essentially defined by its outer perimeter 505. In the FIG. 5 embodiment, the pump zones 580-1, 580-2 shown in FIG. 5, which may correspond to the pump zones 280-1, 280-2 shown in FIG. 2b, laterally surround the lens zone 570 shown in FIG. 5, which may correspond to the lens zone 270 shown in FIG. 2b. As in the FIG. 2b embodiment, the lens zone 570 is in the center of the circular line. Moreover, the isotropically deforming actuator 530 is configured as being ring-shaped, extending within the pump zones 580-1, 580-2, wherein the pump zones 580-1, 580-2 laterally surround the lens zone 570. The particular geometry of the lens assembly 500 and the fluidic chamber unit 510-1, 510-2 is radially symmetric with respect to a central (optical) axis 555, so that the highest efficiency of the actuator 530 will be assured, wherein the actuator 530 may contain isotropically formable electroactive layers, electrodes and elastic layers, as described correspondingly before.

Referring to FIG. 5, the substrates 502-1, 502-2 may be structured so that each of them will be configured as a fixed lens having a predefined shape 504-1, 504-2. In particular, the two opposing substrates 502-1, 502-2 may be configured such that they form a preformed convex lens in the lens assembly 500 shown in FIG. 5.

In the stack or lens assembly 500, the fluidic chamber units 510-1, 510-2 may define respective fluidic chambers, which may be filled with fluidic media whose refractive indices have a large contrast.

Figure 6:
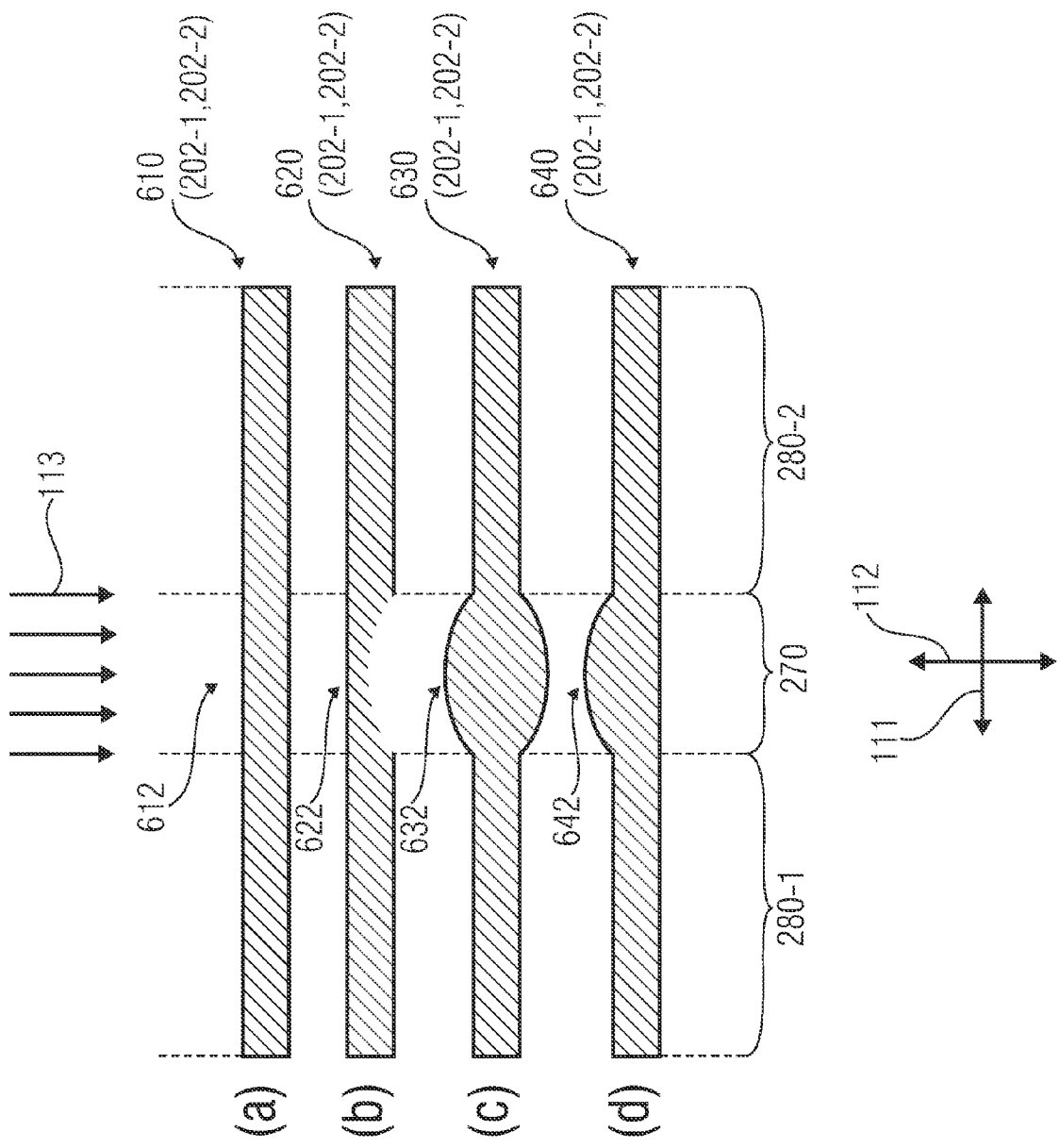
FIG. 6a is a side view of an embodiment of a substrate portion of a sealed housing of a fluidic variable focal length optical length configured as a fixed lens.
FIG. 6b is a side view of a further embodiment of a substrate portion of a sealed housing of a fluid variable focal length optical lens configured as a fixed lens.
FIG. 6c is a side view of a further embodiment of a substrate portion of a sealed housing of a fluidic variable focal length optical lens configured as a fixed lens.
FIG. 6d is a side view of a further embodiment of a substrate portion of a sealed housing of a fluidic variable focal length optical lens configured as a fixed lens.

FIGS. 6a; 6b; 6c; 6d show a side view of different embodiments of substrate portions 612; 622; 632; 642 of a sealed housing of a fluidic variable focal length optical lens, each configured as a fixed lens. As shown in FIGS. 6a; 6b; 6c; 6d, the predefined shape of the substrate portions 612; 622; 632; 642 or a fixed lens in the lens zone 270 is characterized by a pair of surfaces selected from a group consisting of plane, convex, concave, spherical and aspherical surfaces, respectively. With respect to incoming light beams 113, the fixed lenses 612, 622, 632, 642 have two plane surfaces (FIG. 6a), a plane and a concave surface (FIG. 6b), two convex surfaces (FIG. 6c) or a convex and a plane surface (FIG. 6d). Therefore, the embodiments of FIGS. 6a; 6b; 6c; 6d illustrate various possible substrates 610; 620; 630; 640, which may be structured so as to contain fixed lenses such as a plane lens (FIG. 6a), a plane-concave lens (FIG. 6b), a bi-convex lens (FIG. 6c) or a convex lens (FIG. 6d). The fixed lenses may consist of spherical, aspherical or any other possible combination of lens surfaces. In particular, the substrates can be fully or partially (i.e. at least in the lens zone 270) made of materials transparent in the optical range.

Figure 7:
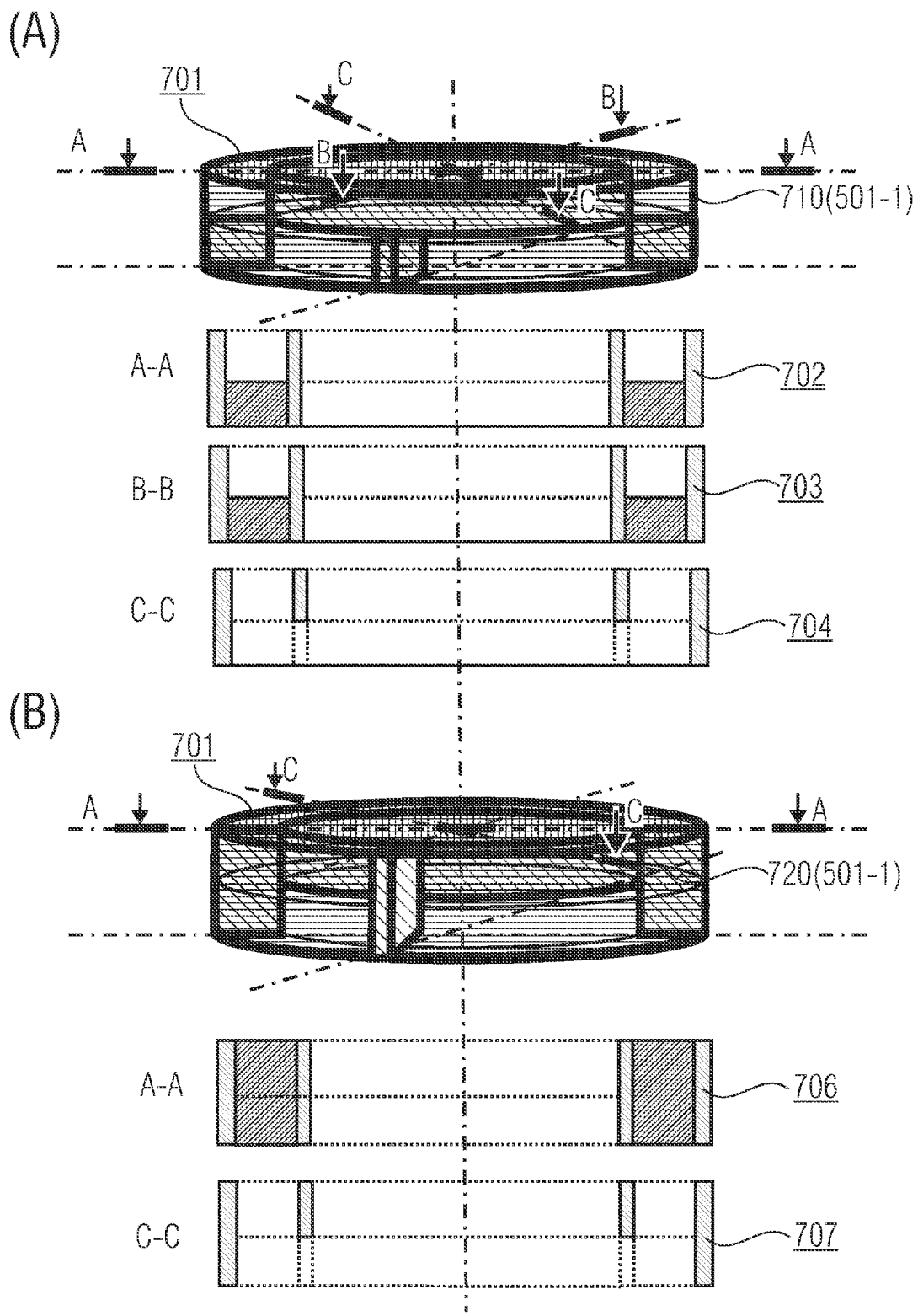
FIG. 7a is a perspective view of an embodiment of a fluidic unit body.
FIG. 7b is a perspective view of a further embodiment of a fluidic unit body.

FIGS. 7a, 7b show a perspective view of different embodiments of two fluidic unit bodies 710, 720, which may correspond to the fluidic unit body 501-1 shown in FIG. 5. Specifically, the embodiments of FIGS. 7a; 7b display the fluidic unit bodies 710, 720 in perspective or three-dimensional views 701, 705 and their respective cross-sectional views 702, 703, 704, 706, 707 on various planes as follows. In FIG. 7a, the fluidic unit body 710 is shown with the cross-sectional view about the planes A-A (702), B-B (703) and C-C (704). In FIG. 7b, the fluidic unit body 720 is shown with a cross-sectional view about the plane A-A (706) and C-C (707). The fluidic unit bodies 710, 720 of the FIGS. 7a; 7b embodiments may be structured on a silicon, glass or polymer wafer.

FIG. 8a shows a side view of an exemplarily design 800-1 of a fluidic variable focal length optical lens, while FIGS. 8b; 8c; 8d; 8e; 8f; 8g show top views of a lens section of the exemplarily design 800-1 of the fluidic variable focal length optical lens in accordance with FIG. 8a, wherein front lens unit arrangements 800-2, 800-3, 800-4, 800-5, 800-6, 800-7 are illustrated. The exemplarily design 800-1 shown in FIG. 8a essentially corresponds to that of the fluidic variable focal length optical lens 200-2 shown in FIG. 2b. In particular, the fluidic chamber unit 210-1 or lens unit together with the elastic (lens) membrane 220 and different membrane-actuator combinations 850-1, 850-2, 850-3, 850-4, 850-5, 850-6, which may correspond to the combination 250 of the membrane 220 and the actuator 230 shown in FIG. 2b, are viewed in cross-section from the top as indicated in FIG. 8a. The different panels indicate possible diving/connection configurations within the pump zone essentially defined by a region of the membrane/actuator combination 850-1, 850-2, 850-3, 850-4, 850-5, 850-6 and between the pump and the lens zones, the latter essentially being defined by a region of the membrane 220, based on walls with openings or "windows"/ "channels" 810-1, 810-2, 810-3 and continuous walls without openings 820-1, 820-2, 820-3, 820-4, 820-5. Here, a continuous wall and a wall with a (window) opening is defined in that the continuous wall continuously extends across the first fluidic unit body 210-1 along the normal direction 112 without being interrupted, while the wall with the window opening is non-continuous along the normal direction 112, therefore, providing channels or windows 811 as shown in FIG. 8a. The channels or windows 811 essentially provide fluidic paths extending along the lateral (radial) direction 111 between the pump zones and the lens zone as shown in the design 800-1.

FIG. 8b shows the top view of the lens unit 800-2, wherein dividing walls 810-1 with windows may be positioned diagonally across the lens unit 800-2. This arrangement essentially corresponds to the top view of the design 800-1 from FIG. 8a. In the design of FIG. 8b, the actuator of the membrane-actuator combination 850-1 is configured to keep its radial symmetry unobstructed so that an efficient deformation of the electroactive layers, which may be contained in the actuator, will be obtained. This is because in the pump zone, the membrane-actuator combination 850-1 can efficiently be bent into a free space provided by the window openings of the walls 810-1.

FIG. 8c displays a lens unit 800-3 with dividing continuous walls 820-1 and dividing walls with windows 810-2, which may all be positioned diagonally across the lens unit 800-3. This arrangement basically represents the top view of the chamber from FIG. 7b.

According to further embodiments, further geometries based on different membrane-actuator combinations 850-3, 850-4, 850-5, 850-6 may be used for the lens unit arrangement 800-4, 800-5, 800-6, 800-7. In FIGS. 8d, 8e, the lens unit arrangements 800-4, 800-5 have particular geometries in the form of an iris diaphragm. The respective geometries are appropriately shaped by dividing walls with windows 810-3 and dividing continuous walls 820-2 (FIG. 8d) and dividing continuous walls 820-3 (FIG. 8e).

In FIGS. 8f; 8g, the lens unit arrangements 800-6, 800-7 are based on membrane-actuator combinations 850-5, 850-6 essentially being shaped as ellipses (FIG. 8f) or radially symmetrical discs (FIG. 8g). The fluidic paths or the connection between the pump and the lens zones in the arrangements 800-6, 800-7 of FIGS. 8f; 8g may be provided via channels, wherein also different other possible geometries could exist.

FIGS. 9a; 9b show side views of different embodiments of fluidic variable focal length optical lenses 900-1, 900-2. Both fluidic optical lenses 900-1, 900-2 consist of two fluidic chambers 205-1, 205-2, wherein the two fluidic chambers 205-1, 205-2 have either identical (FIG. 9a) or different geometries (FIG. 9b). According to further embodiments, a respective sealed housing 950, 960 of the fluidic optical lenses 900-1, 900-2 comprises two opposing portions 912, 922, 932, 942 extending within the lens zone 270, at least one of which is configured as a fixed lens having a predefined shape. In case of identical geometries as shown in FIG. 9a, the sealed housing 950 comprises the two opposing portions 912, 922 within the substrates 910, 920, wherein the two opposing substrate portions 912, 922 are configured such that their surfaces bend in a direction pointing away from the membrane 220. In case of different geometries as shown in FIG. 9b, the sealed housing 960 comprises the two opposing portions 932, 942 within the substrates 930, 940, wherein the two substrate portions 932, 942 are configured such that both surfaces of the substrate portion 942 bent in a direction pointing away from the membrane 220 and an inner surface 934 of the substrate portion 932 bends in a direction pointing toward the membrane 220, while an outer surface 936 of the substrate portion 932 is flat. In the FIGS. 9a; 9b embodiments, the sealed housings 950, 960 can be built entirely from transparent materials.

It can be seen in FIG. 2b or FIGS. 9a; 9b that the fluidic variable focal length optical lenses 200-2 or 900-1; 900-2, respectively, represent a closed system formed by the sealed housing 120 and 950; 960, wherein the two fluidic chambers 205-1; 205-2 are filled with the two fluidic media 105-1; 105-2. Such a closed system is advantageous because it is relatively robust and can therefore resist or be independent of external variations/surrounding conditions such as pressure variations and/or temperature variations acting on same. The further advantage of the closed system is that the two fluidic media 105-1, 105-2 may be chosen such that a diffusion of the first or the second fluidic medium 105-1, 105-2 through the membrane 220 due to a permeability thereof will be prevented or at least made less probable.

Specifically, the embodiments of FIGS. 9a; 9b provide the two opposing substrate portions 912, 922; 932, 942 structured within the sealed housings 950; 960 and two opposing sides of each of the sealed housings 950; 960 in the lens zone 270, thereby allowing a better adjustment and/or flexible handling of focusing properties of the closed system.

The first 105-1 and the second fluidic medium 105-2 that are typically used in the previously described embodiments are gases and/or liquids selected from a group consisting of air, water, silicone, oil, immersion oil, uncured silicone, a mixture thereof, a dye or salt containing liquid, a gel and hydrogel. In particular, the first and the second fluidic medium 105-1, 105-2 are transparent in an optical range.

According to further embodiments of the present invention, a dispersion characteristics of the first 105-1 and/or the second fluidic medium 105-2 matches a dispersion curve of the membrane 120.

Figure 10:
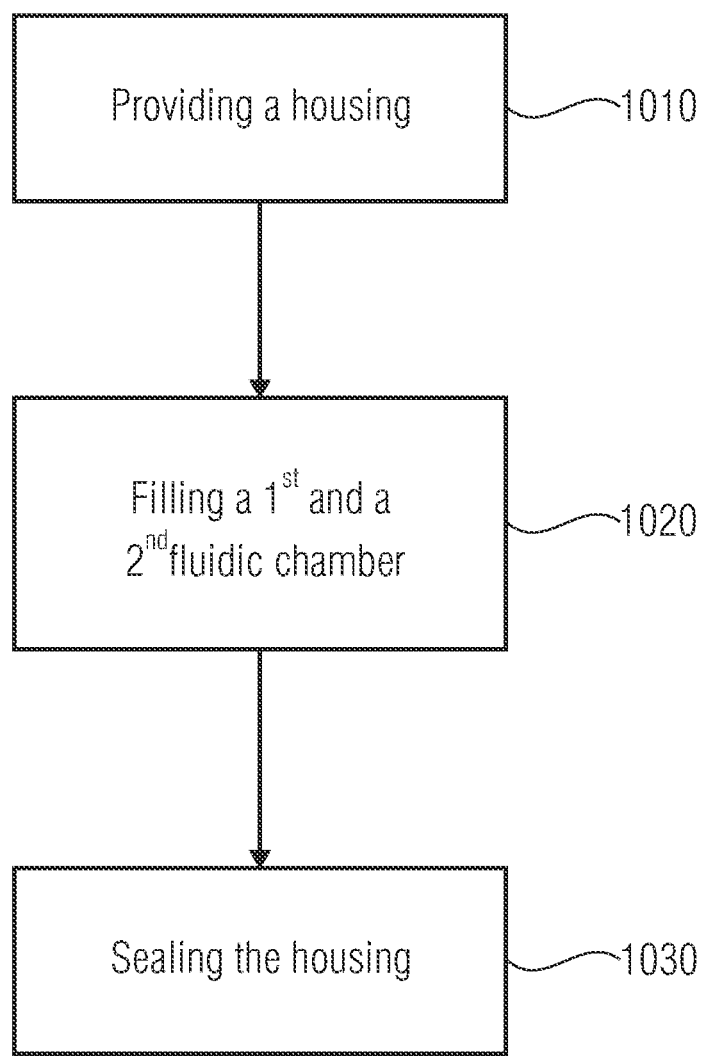
FIG. 10 is a flowchart of an embodiment of a method for manufacturing a fluidic variable focal length optical lens.

FIG. 10 shows a flowchart of an embodiment of a method 1000 for manufacturing the fluidic variable focal length optical lens. The method 1000 comprises the steps of providing 1010, filling 1020 and sealing 1030. First, a housing is provided (step 1010) comprising a first fluidic chamber 101-1 and a second fluidic chamber 101-2, the first 101-1 and the second fluidic chamber 101-2 being separated from each other by an elastic membrane 120, and a deformator 130 configured to deform the membrane 120 laterally within the pump zone 140. Then, the first fluidic chamber 101-1 is filled with the first fluidic medium 105-1 and the second fluidic chamber 101-2 is filled with the second fluidic medium 105-2 (step 1020). Here, the first 105-1 and the second fluidic medium 105-2 have different refractive indices. Finally, the housing 110 is sealed (step 1030), wherein the deformator 130 is configured to deform the membrane 120 laterally within the pump zone 140, so that the first fluidic medium 105-1 is laterally displaced from the pump zone 140 to a lens zone 150 and the second fluidic medium 105-2 from the lens zone 150 to the pump zone 140. Consequently, the membrane 120 also deforms in the lens zone 150 and changes a focal length of the lens zone 150 along a normal direction.

Figure 11:
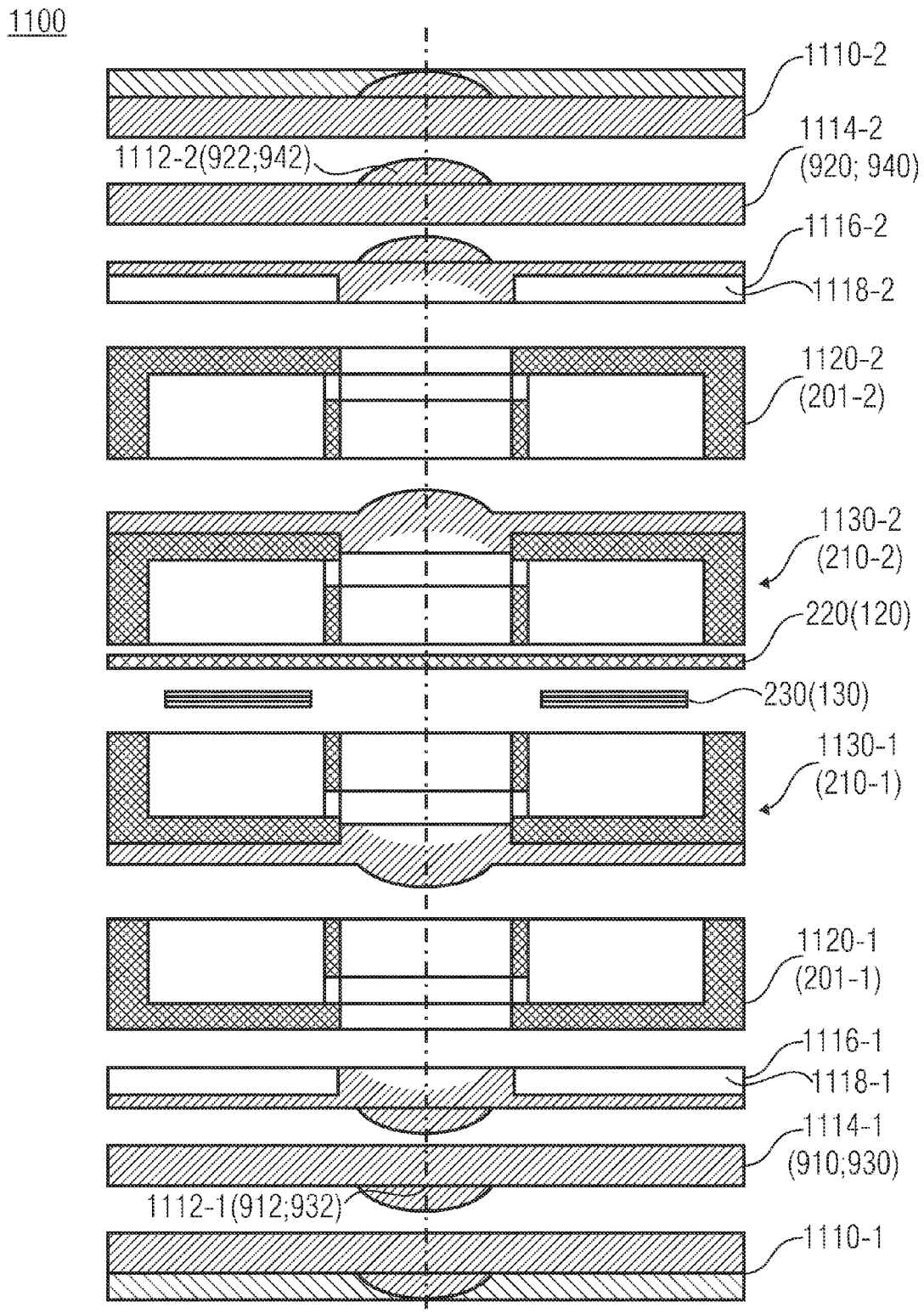
FIG. 11 is a side view of parts to be assembled as provided by the embodiment of the method in accordance with FIG. 10.

FIG. 11 shows a side view of parts 1100 to be assembled as provided by the method 1000 in accordance with FIG. 10. According to further embodiments, the fabrication of the parts 1100 to be used for the fluidic variable focal length optical lens or the variable lens assembly may comprise the following steps. First, two basic substrates 1110-1, 1110-2 may be provided. Then, the two basic substrates 1110-1, 1110-2 may be structured, so that fixed lenses 1112-1, 1112-2, which may correspond to the substrate portions 912; 932 and 922; 942, respectively, will be obtained. Here, the fixed lenses 1112-1, 1112-2 are formed within structured substrates 1114-1, 1114-2, which may correspond to the substrates 910; 930 and 920; 940, respectively. Then, the structured substrates 1114-1, 1114-2 may be further structured to provide grooves 1118-1, 1118-2 inside further structured substrates 1116-1, 1116-2. In particular, the structuring may be performed by fabrication processes such as etching of a wafer, which can, for example, be made of glass, polymer, etc. Then, fluidic unit bodies 1120-1, 1120-2, which may correspond to the fluidic unit bodies 201-1 and 201-2, may be structured as described before by fabrication processes, such as etching of a silicon, glass or polymer wafer. In the manufacturing process, the structure of the substrates 1114-1, 1114-2 (i.e. its substrate design with integrated fixed lenses 1112-1, 1112-2) and the structure or design of the fluidic unit bodies 1120-1, 1120-2 can be different from each other, such as in the previous embodiments. Then, the thus prepared further structured substrates 1116-1, 1116-2 may be bonded together with the respective fluidic unit bodies 1120-1, 1120-2, so as to form fluidic chamber units 1130-1, 1130-2, which may correspond to the fluidic unit bodies 210-1, 210-2, respectively. Finally, the variable focus lens assembly, which may correspond to the fluidic variable focal length optical lens 900-1, will be obtained, in particular, by bonding together the fluidic chamber units 1130-1, 1130-2, the membrane 220 and the actuator 230.

In short, the parts 1100 can be assembled in the following way. First, the first fluidic unit body 1120-1 is filled with a first fluidic medium and placed on a first structured substrate 1116-1, which can be structured so as to contain a fixed lens. In this way, the first fluidic chamber unit 1130-1 is obtained. Then, the actuator 230, such as an electro-active layered structure is placed on the first fluidic chamber unit 1130-1 with a deformable, elastic membrane 220 attached to it. Then, a second fluidic unit body 1120-2, which is filled with a second fluidic medium, is placed on the actuator-membrane structure consisting of the actuator 230 and the membrane 220. Finally, a second structured substrate 1116-2, which may also include a fixed lens, is attached to the second fluidic unit body 1120-2, so that the fluidic chamber unit 1130-2 is sealed.

Referring to FIG. 10, the step 1010 of providing a housing comprises fixing the membrane 220 between the first fluidic chamber unit 1130-1 defining the first fluidic chamber 101-1 and the second fluidic chamber unit 1130-2 defining the second fluidic chamber 101-2.

The above described manufacturing, especially the fabrication of the fluidic chamber units or an exemplary liquid chamber structure fabrication, can be realized by standard silicon process fabrication technology. The fabrication methods can comprise lithography-based microsystem technology, nano-technology and precision engineering. Fabrication processes based on silicon fabrication such as photolithography should be used as well as processes such as glass and metal etching, deposition and bonding. On the other side, there are soft materials fabrication processes which can be used such as PDMS (Polydimethylsiloxane) processing by e.g. soft lithography, thick-film- and stereolithography as well as fast replication methods via electroplating, injection molding, nanoimprinting and embossing. By making use of silicon fabrication methods several devices are fabricated in parallel on one wafer allowing for a cost-effective production.

Figure 12A:
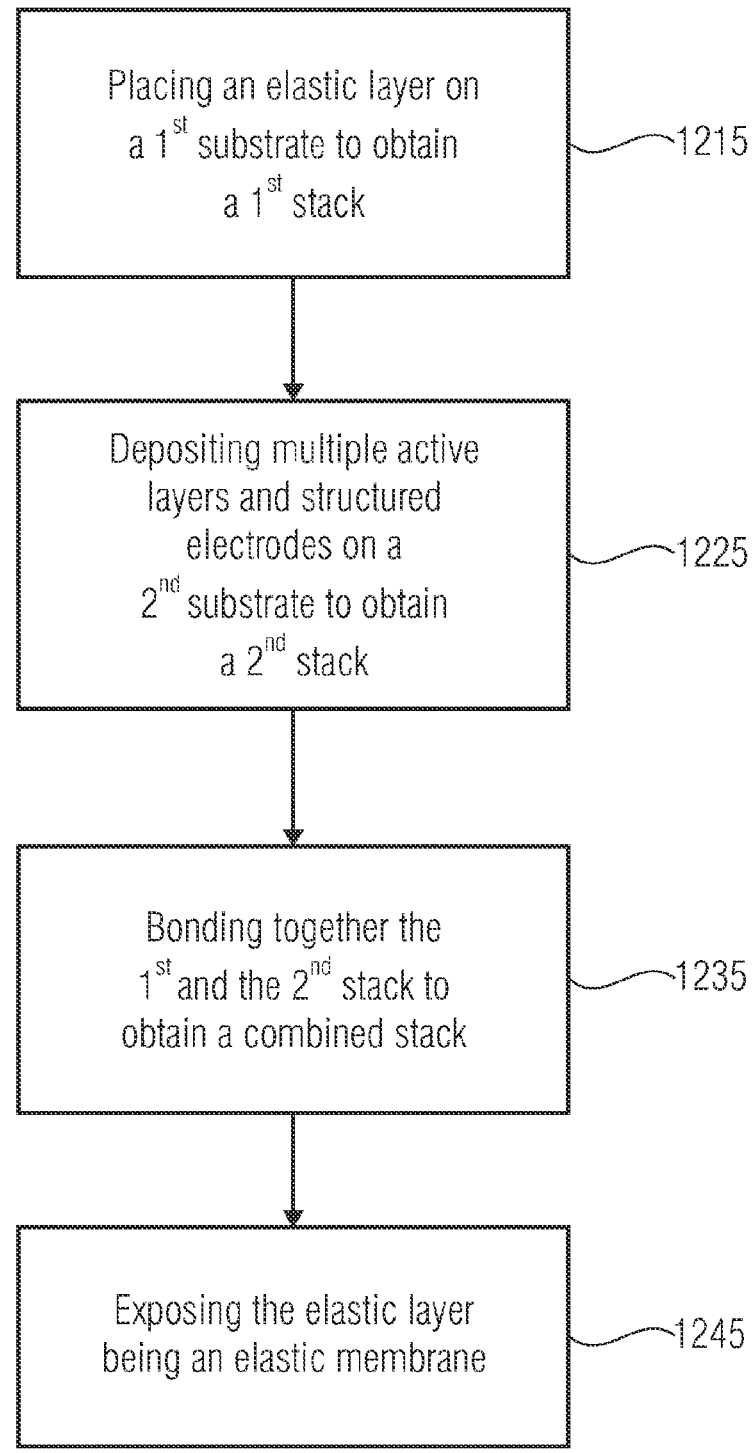
FIG. 12a illustrates exemplary fabrication steps for manufacturing a polymer actuator and an elastic membrane.
Figure 12B:
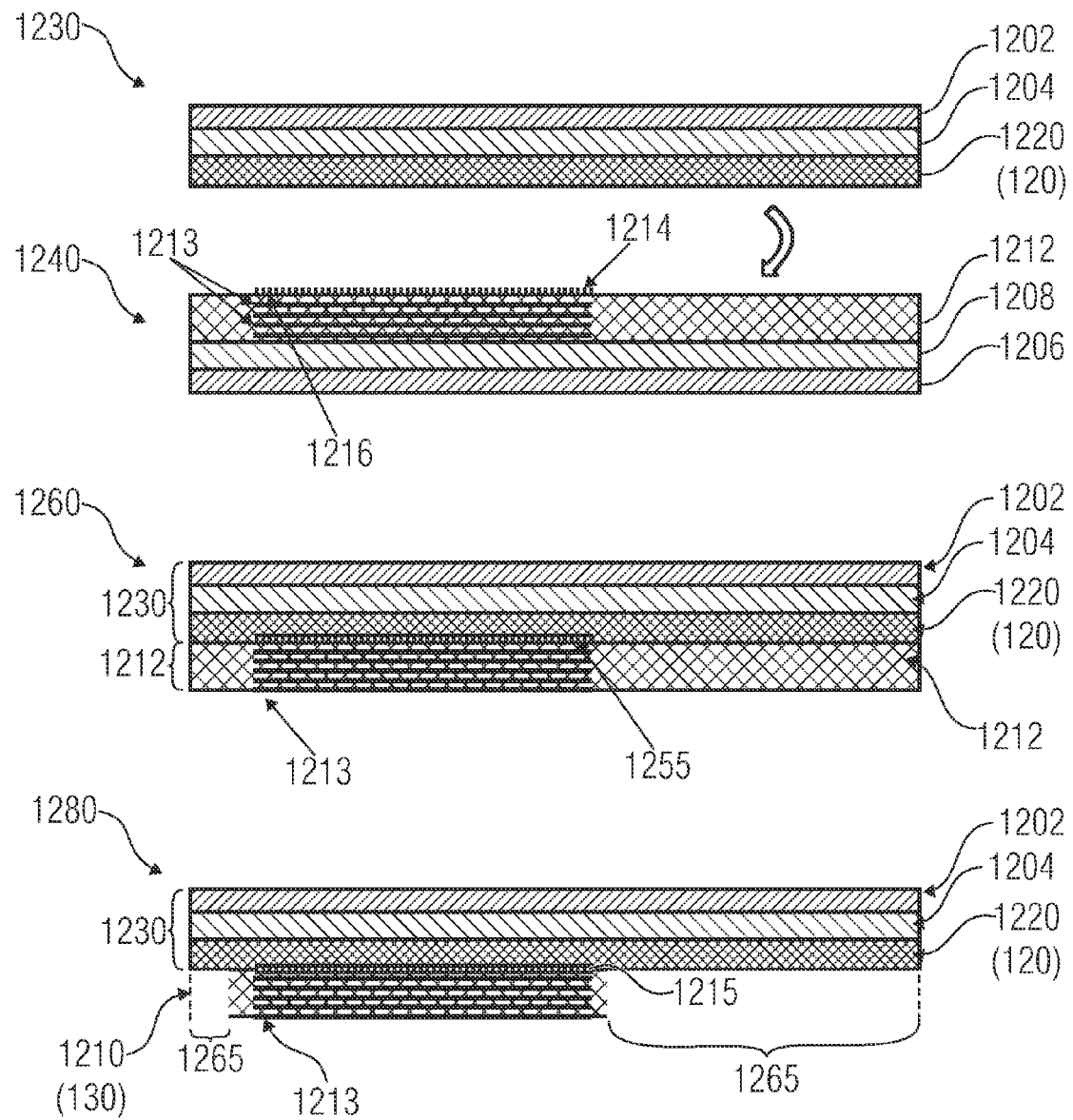
FIG. 12b is a side view of parts obtained with the exemplary fabrication steps for manufacturing the polymer actuator and the elastic membrane.

FIG. 12a illustrates exemplary fabrication steps 1200 for manufacturing a polymer actuator 1210 attached to an elastic membrane 1220 according to the FIG. 12b embodiment. The fabrication steps 1200 may comprise placing an elastic layer on a first substrate to obtain a first stack (step 1215), depositing multiple active layers and structured electrodes on a second substrate to obtain a second stack (step 1225), bonding together the first and the second stack to obtain a combined stack (step 1235) and exposing the elastic layer being an elastic membrane (step 1245).

FIG. 12b shows a side view of respective parts that may be obtained in each of the steps 1215, 1225, 1235 and 1245. Referring to FIG. 12b, in the step 1215 of placing, an elastic layer 1220 is placed on or attached to a first substrate 1202, which may be, e.g. a silicon or a glass wafer, via an intermediate release layer 1204. The elastic layer 1220, the intermediate release layer 1204 and the first substrate 1202 constitute a first stack 1230. In the step 1225 of depositing, multiple active layers 1212 and structured electrodes 1213 are deposited, e.g., alternately via layer-by-layer methods on a second substrate 1206 with an intermediate release layer 1208. The multiple active layers 1212, the intermediate release layer 1208 and the second substrate 1206 constitute a second stack 1240. As shown in FIG. 12b, a structured primer layer 1214, which is placed on the end electrode or uppermost electrode 1216, terminates the second stack 1240. In the step 1235 of bonding, the first and the second stack 1230, 1240 are bonded together via a primer layer 1255, so that a combined stack 1250 (not shown) is obtained. Then, the second substrate 1206 is detached by removing the release layer 1208, so that a structure 1260 is obtained. In the step 1245 of exposing, the surface of the elastic layer 1220, which may correspond to the elastic membrane 120, is exposed by removing the multiple active layers 1212 from the structure 1260. The step 1245 of exposing may be performed via structuring, e.g., using laser ablation, wet etching or lift-off processes, which can be applied to relevant areas 1265. Subsequently, the elastic membrane 1220 may also be exposed by detaching the substrate 1202 via removing the intermediate release layer 1204. The resulting multi-layered stack 1280, which may correspond to the membrane-actuator combination 250 of FIG. 2a, may readily be used in the fluidic variable focal length optical lens. The electrical connection for the electrodes can be realized via lateral metal lanes each contacted to the electronics.

According to further embodiments, in order to ease the fabrication, the same material may be used for the elastic layer of the actuator and the elastic (lens) membrane or the same elastic layer may be used for both the elastic layer of the actuator and the elastic lens membrane, thereby providing both their functions in a single elastic layer.

Figure 13:
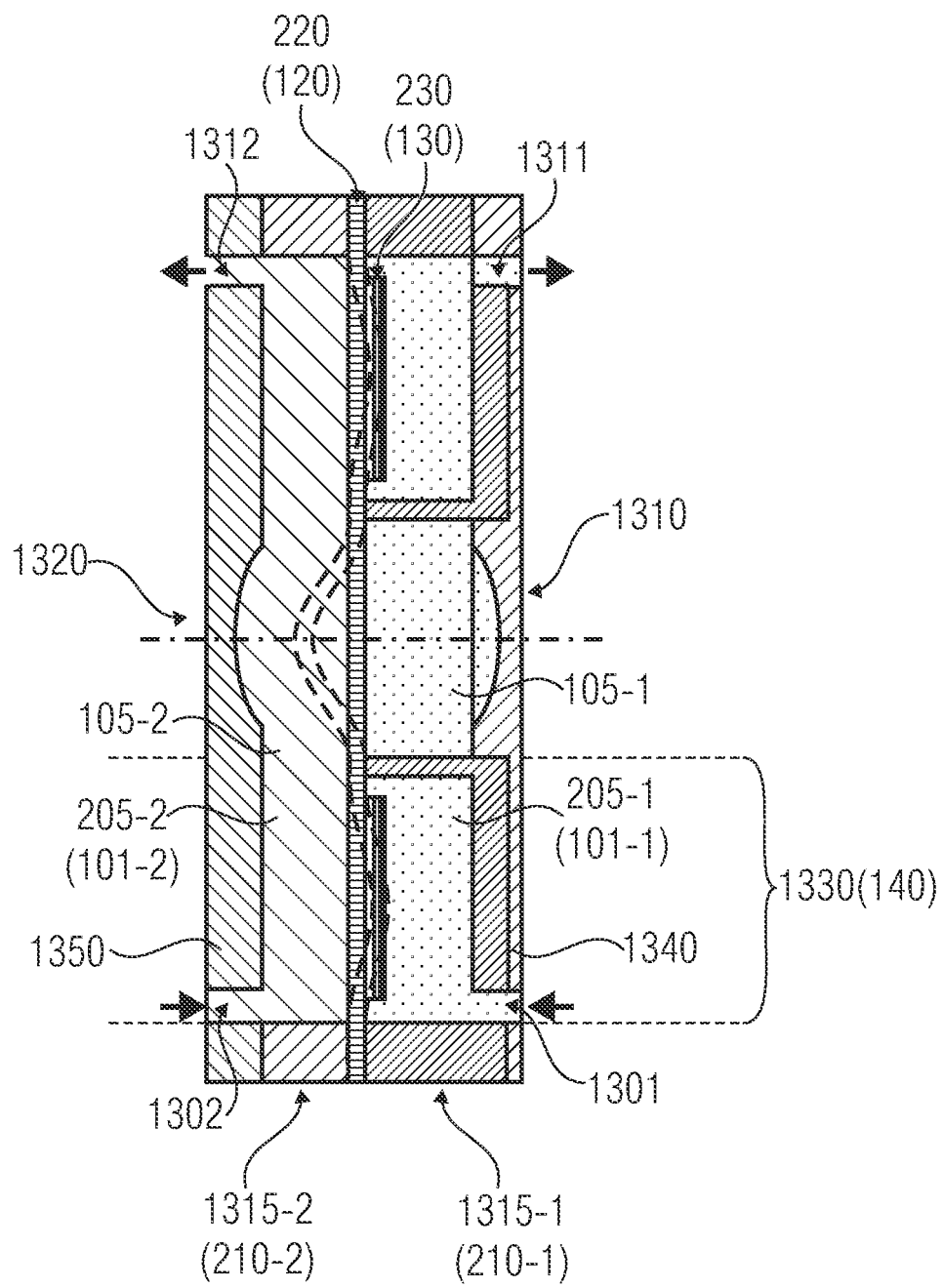
FIG. 13 is a side view of an embodiment of a fluidic variable focal length optical lens with two microchannels to be positioned for performing a step of filling of the embodiment of the method in accordance with FIG. 10.

FIG. 13 shows a side view of a further embodiment of the fluidic variable focal length optical lens 1300 with microchannels to be used for performing the step 1020 of filling of the method 1000 in accordance with FIG. 10. The FIG. 13 embodiment essentially corresponds to the FIG. 9b embodiment. However, in the FIG. 13 embodiment, there are two opposing substrate portions 1310, 1320 especially configured as fixed plane-concave lenses. Also, FIG. 13 explicitly shows two microchannels 1301, 1302 for filling the fluidic chambers 205-1, 205-2 with the fluidic media 105-1, 105-2.

In particular, the step 1020 of filling may be based on capillary effects and/or performed by dispensing/injecting the first fluidic medium 105-1 through the first microchannel 1301 into the first fluidic chamber 205-1 and the second fluidic medium 105-2 through the second microchannel 1302 into the second fluidic chamber 205-2. As can be seen in FIG. 13, the first and the second microchannel 1301, 1302 extend through the first and the second fluidic chamber 1315-1, 1315-2 within the pump zone 1330, which may correspond to the pump zone 140 of FIGS. 1a; 1b.

According to further embodiments, the step 1020 of filling is performed in that the first and the second fluidic chamber 205-1, 205-2 are filled synchronously, wherein a pressure difference between the first and the second fluidic chambers 205-1, 205-2 is controllable. By such filling means, the membrane 220 will remain in a same state of deformation during the filling process.

According to further embodiments, the method 1000 may further comprise the optional step of submerging the housing into a vessel under vacuum. This allows that gas bubbles, which may be trapped in the first and the second fluidic chamber 205-1, 205-2, can be released through the first and the second microchannel 1301, 1302.

In accordance with the FIG. 13 embodiment, the filling (step 1020) of the fluidic chambers 205-1, 205-2 with the fluidic media 105-1, 105-2 should be performed after the individual fluidic chamber units 1315-1, 1315-2 or the lens units are bonded together. In case that a desired lens tunability ranges from infinite to concave and/or convex, it may be an important issue to maintain a flat elastic membrane during and after the filling procedure. As has been described above, this can be realized when the fluidic chambers are filled synchronously to counter-balance the mechanical forces involved. A synchronous filling can also be used for the case that the desired curvature range does not include a plane surface or if it is needed that the lens has a finite focal length in its off-state. In this case, a fixed deformation of the membrane can be obtained either by inducing geometrical changes via controlled preforming and/or structuring or pressure changes, such as by generating a slight pressure difference in the two adjacent fluidic chambers 205-1, 205-2.

According to further embodiments, methods for filling the fluidic chambers of the lens device may include various possibilities, such as outgassing/vacuum through direct application of a pressure gradient on chamber outlets, which could be microchannels 1311, 1312 (see FIG. 13), or usage of either capillary forces together with other mechanical forces when employing injection to fill the fluidic media from an attached micro-dispensing reservoir respectively syringe. As shown in FIG. 13, the microchannels 1301, 1302 are positioned on respective substrates 1340, 1350. For a proper filling with viscous liquids the choice of the aspect ratio of the microchannels 1301, 1302 should be considered. Their positions may be chosen to ease the fluidic filling procedure when multiple devices on a wafer are produced. Moreover, the additional microchannels 1311, 1312 can be provided as points for detection when the fluidic chambers are fully filled.

As the membrane 220 and the actuator 230 are typically not mechanically rigid, strong mechanical forces resulting from the above-mentioned outgassing procedure could cause an extra unwanted deformation. Also, eventually, gas bubbles such as air bubbles can be trapped in some places with tight angles. Thus, with the optional step of submerging the fluidic device into a vessel with reduced pressure, trapped gas bubbles may be released. According to further embodiments, the gas bubbles can be detected by employing fluorescent methods.

With regard to manufacturing of the actuator (see FIGS. 3; 12b), the electrostrictive layers are sandwiched between electrodes. The electrode materials of choice should have good electrical conductivity in thin layers, be easy to structure, and have good adherence to the active layer and good resistance at hydrolysis. Suitable electrode materials could be inorganic materials with high electrical conductivity such as aluminum, aluminum alloys such as TiAl (these materials having the additional advantage of being compatible with CMOS processes), silver, copper, gold, other alloys etc. Such electrodes could be either deposited in uniform layers or even structured layers when the aim is to increase the mechanical flexibility of the electrode layer. Mechanically flexible electrode materials of choice could be carbon electrodes (patterned carbon or grease), organic materials such as conductive polymers (PANI, PEDOT, etc.) or non-conductive polymers with a conductive inorganic/organic filler the so-called electrically conductive polymer composites (ECPC) such as SU8 with implanted silver nanoparticles. Moreover, polymer materials can be sensitive to UV irradiation. Using such polymers as electrode layers can be of advantage for the actuator fabrication process which could in this case include selective polymer structuring by irradiation with UV light.

The layers can be bonded together in order to increase adherence and avoid layer delamination by using various primers and/or glues, and/or O2 plasma activation/treatment, and/or TetraEtch for fluoropolymers. The selected primers should meet the following conditions such as high adherence between layers over a long period of time, low elastic modulus, ease in thin film fabrication, rapid dehydration or high stability to temperature variation and humidity. Moreover, if needed, they should be UV curing compatible. Possible primers of choice, for example, are epoxies or UV-hardened acryls or rubbery hydroxyl terminated butadiene resign. Eventually, electrical conductive primers can be used as alternative for electrode materials or only as end electrodes.

As far as the additional elastic layer is concerned, potential suitable materials could be elastomers such as silicon elastomers, fluoroelastomers, etc.

The needed mechanical properties of the elastic lens membrane of the previous embodiments are similar to those of the elastic layer contained in the actuator, therefore the option exists to use the same layer for both functions. In fact, when the actuator is activated and the fluid pushed accordingly against the lens membrane, the induced pressure acts on the membrane and deforms it. Providing that the pressure is uniformly distributed across the elastic membrane surface, the resulting deformation of the membrane will be approximately spherical. On the other hand, in particular for a dynamic operation of the lens, if the exerted pressure distribution is appropriately changed, aspherical lens membrane deformations can be obtained. Accordingly, if, e.g. gray scale lithography is used to additionally pattern the lens membrane, its topology can be adjusted as desired within a wide range. This could allow for optimization of the curvature profile in its deflected state for a specific application. The surface curvature depends on the exerted pressure, lens diameter, layer thickness and elastic modulus.

Phenomena to be taken into account when the goal is to maintain a flat surface for the lens membrane are acceleration and gravitation. They can be minimized, for instance, by designing chambers with equal volumes and/or using fluids with similar densities and/or by designing the lens membrane and actuator membrane such that they have similar mechanical restoring forces.

The elastic membrane which forms the optical lens surface is made of a material with high optical transmission in the region of interest, high elasticity respectively small elastic modulus (advantageously <1 GPa), lowest possible permeability of liquids and gases of interest, stable and reproducible cross-linking. Materials of choice can be elastomers such as silicon elastomers, fluoroelastomers, etc.

The fluidic unit bodies of the previous embodiments define each fluidic chamber formed on a substrate. Being positioned in the optical path, the substrate is made from a material transparent in the optical range of interest. An important advantage of the presented design is that additional fixed optical elements (i.e. fixed lenses) can be placed in these substrates by structuring. Such elements could be, for instance, correction lenses of various curvatures as well as various optical correction layers deposited on the available surfaces.

In fact, relevant correction coatings can be added on any available either fixed or variable surface by an appropriate choice of the coating material, which can be either inorganic or organic. Antireflex (AR) coatings may be added to reduce unwanted reflections (e.g. ghosts) and improve sharpness by reducing the stray light AR coatings can be deposited on both sides of the lenses contained in the substrates and/or both sides of the variable membrane lens. For the latter, flexible organic materials, such as polymer materials are suitable to use as coating materials. In addition, to compensate for a chromatic aberration, optical materials with high Abbe number can be selected.

Optical fluids (fluidic media) of choice should have characteristics such as high optical transparency at the wavelength range of interest, resistance at radiation (i.e. no coloration, no chemical or physical changes should occur upon prolonged exposure to light), low permeability/diffusion through the elastic membrane, no toxicity or stability at temperature variation in the temperature range of interest. One of the fluidic media may advantageously match the dispersion characteristics of the membrane material.

To increase the focal length tunability range, fluidic media with high refractive indices contrast are selected. Fluidic media of choice are, for instance, air, water, silicone oils, immersion oils, uncured silicone, gels and hydrogels, or mixtures of these fluids or various other mixtures and low viscosities, such as aqueous solution of sodium dichromate with various concentrations, liquid crystals, various dyes containing liquids (such as azo dyes). The refractive indices of the fluidic media could cover a relatively wide range. Moreover, by a proper selection of the fluidic media, it will be possible to controllably adjust parameters, such as refractive index and transmission for wavelength selective applications by using dyes, thermoactive or photoactive liquids or gels.

As already mentioned above, the fluidic chamber units (see, e.g. FIGS. 9a; 9b) can be made from a combination of different materials and wafers bonded together in different geometries, such as geometrically on/below the membrane-actuator combination.

The organic thin films constituting the membrane, the active layers and eventual the electrodes could be fabricated by spin coating, dip coating, brushing, printing or other known processing methods. The materials used should be soluble in highly volatile solvents such as toluene, chloroform, acetone, methyl ethyl ketone (MEK), ethanol etc. and should be easily processable by spin coating or other suitable processes. At the fabrication of bilayers and multilayers, the solvents should be carefully chosen as there is a risk of damaging the completed layers when attempting to deposit additional coatings (for instance by re-dissolution). Advantageously the inorganic electrodes can be deposited via evaporation or sputtering using shadow masks and structuring by etching or photolithography or other methods (e.g. UV curing of conductive polymers such as PEDOT or Poly(3,4-ethylenedioxythiophene, PANI or Polyaniline etc.).

For fabrication of high quality multilayers stack actuators, special care ought to be taken of various parameters such as polymer molar masses, polymerviscosity, film homogeneity, films adherence, substrates materials etc. Defects such as film thickness inhomogeneities, pinholes, air bubbles, comets, streaks, flakes, whirl pattern, center circles and uncoated areas, which are specific for each polymer solution, should be corrected by an appropriate choice of processing parameters.

The materials chosen should be stable in a typical temperature range of −20 to 80° C. and should be highly resistant against chemical and environmental influence. All materials used and coming in contact with the membrane, actuators, electrodes, primers or optical fluids should be compatible to each other over a long period of time in order to avoid damaging or changing of properties via dissolution, mixing, brittleness, cracking, swelling or gas adsorption as well as any chemical or thermal influences.

According to further embodiments, the membrane and the electro-active layer element may either be attached to each other or placed around each other in various geometries, such as exemplarily shown in FIGS. 8b-8g.

Embodiments of the fluidic variable focal length optical lens or the inventive variable focal length system provides a modular system where additional fluidic chambers and deformable elastic membranes could be added. This would allow for further optimization of the relevant optical parameters.

The lens device or fluidic variable focal length optical lens can be operated either in static or in dynamic mode. In fact, for a dynamic operation, an important advantage in using polymer electrostrictive actuators is their fast response time (at the order of 1 ms).

Basically, the above-described lens system could be integrated in a zoom objective or autofocus system for a camera in a cell phone. The zooming range depends upon the geometry of the lens and the indices contrast. The resolution of the camera is limited by diffraction (fixed aperture) and by aberrations, which can be minimized as shown above.

In summary, embodiments of the present invention provide a fluidic variable focal length optical lens, methods of making and usage of the lens and optical devices, which include the lens. Further embodiments of the present invention contain fluidic unit bodies bonded together to form a robust and compact structure.

The presented lens structure contains two fluidic chamber units defining internal, fully separated fluidic chambers filled with fluidic media of different refractive indices. Essentially a fluidic chamber is divided into at least two sub-chambers (zones) communicating to one another via windows or channels. These zones are called "pump zone" (as it contains a pump mechanism) and "lens zone" (as it serves as a lens body). In a fluidic chamber, the fluidic medium (working medium) is pushed by an internal pump mechanism from the pump zone against an elastic layer (membrane) in the lens area (FIGS. 1a; 1b). Varying the induced pressure level exerted by the compressed fluidic media when activating the pump on the membrane will result in a variation of the membrane's deformation. In another fluidic chamber, the second fluidic medium is displaced accordingly to conserve the total volume of the system. Providing that the optical properties of the system in the lens zone are optimal, the membrane with adjustable curvature operates as a lens surface. By varying the radius of curvature of the membrane, a variable focal length lens is created.

The fluidic unit bodies are formed on substrates which are structured as to contain additional fixed optical elements such as fixed lenses as well as various correction layers. They are made of (structured in) glass, transparent polymers (e.g. silicone, PMMA etc.), silicon etc. or a combination of these materials.

The pump mechanism is realized by an electroactively deformable layered element (actuator) which contains at least one electroactive layer, sandwiched between conductive electrode layers and an elastic layer. The electroactive layer is made of piezoelectric or electrostrictive materials, wherein an applied electric field induces a strain which increases linearly respectively quadratically with the field. Compliant, highly deformable, electrostrictive materials are advantageous to use. A variable applied electric field will induce a continuously bending of the assumed actuator in a direction perpendicular to its surface. The actuator is made of organic and/or inorganic layers. Basically, the thinner the active layers are and the greater their number in a multilayered stack is, the higher will be the resulting deformation of the actuator at a fixed operation voltage.

The lens membrane and the electroactive layer element can be either connected to each other or placed around each other in various geometries.

The elastic membrane should be highly transmissive in the optical range of interest and highly elastic, respectively with low elastic modulus. Suitable, cost-effective membrane materials are transparent polymers such as silicon elastomers, fluoroelastomers, etc.

Another aspect is the proper selection of the fluidic media for a specific application. In order to achieve a large focal length variation a large refractive index contrast for the chosen fluidic media is desired. On the other side, for an application which needs reducing the stray light effects, one of the selected fluidic medium's dispersion should advantageously match the dispersion curve of the elastic membrane. Further, for reducing the chromatic aberration material fluids with high Abbe number should be selected.

The lens membrane of the presented lens design can deform in either spherical or aspherical shapes.

The fabrication steps for the deformable layered stack actuator and elastic membrane include layer-by-layer methods. The lens units are formed on silicon and/or glass wafer via structuring, patterning and bonding. Various methods are presented for filling the chamber with the corresponding fluidic media.

The inventive lens system can be included in complex miniaturized optical devices that need adjustable focusing such as zoom objective in cell phone cameras, endoscopic systems, beam shaping, etc.

Therefore, a variable lens assembly is described, which contains fluidic media as well as fixed and variably deformable surfaces. The lens assembly has a compact design, which includes several chambers filled with fluidic media of different refractive indices and bonded together. The lens assembly comprises a fluidic unit body built on a substrate, which is structured to contain fixed lenses, a combination of an electroactively deformable layer structure and an elastic membrane, which seals the open end of the formed fluidic chamber, a second fluidic unit body assembled on the first fluidic unit body over the pump-membrane combination and a substrate configured to seal the open end of the second fluidic unit body, wherein the substrate is structured as to contain fixed lenses.

The said electroactively deformable layer structure works as a pump. When the pump is electrically activated, the fluidic media from the fluidic chambers are controllably pumped against the elastic membrane to form a curvature of the membrane, which functions as a variable focal length lens. The compact assembly of fluidic chambers with a variable lens in combination with fixed lenses and relevant correction coatings provide a solution for efficient light coupling in miniaturized imaging systems.

Advantages of the above-outlined embodiments over other designs are its high tunability range and low power consumption. It is also polarization independent, which represents an advantage over liquid crystals or electro-optical lens designs. Finally, it provides the option of adding correction coatings, as opposed to, e.g., liquid lenses, as well as integrated lens distortion corrections.

Therefore, the embodiments of the present invention provide a miniaturized variable focal length lens system with a compact and flexible design, which combines variable and fixed lenses. Further embodiments permit corrections of stray light and aberrations by a deposition of relevant coatings on various surfaces. The inventive lens system is easy to handle and assemble by eliminating the need of alignment of further optical elements. Further advantages provided by the inventive lens system are suitability for on-chip integration, low power consumption and low costs for mass production.

Target applications of embodiments of the present invention are imaging systems, e.g., for cell phone cameras, endoscopic systems or more complex optical systems, including the fluidic variable focal length optical lens.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A fluidic variable focal length optical lens, comprising:
a sealed housing comprising a first fluidic chamber filled with a first fluidic medium and a second fluidic chamber filled with a second fluidic medium, the first and the second fluidic chambers being separated from each other by an elastic membrane, wherein the first and the second fluidic media comprise different refractive indices, wherein the sealed housing includes a lens zone and at least one pump zone, wherein the at least one pump zone covers a first portion of the first fluidic chamber and a first portion of the second fluidic chamber, wherein the lens zone covers a second portion of the first fluidic chamber and a second portion of the second fluidic chamber, wherein the first fluidic chamber comprises a lower support structure arranged to support the elastic membrane at a junction between the at least one pump zone and the lens zone from a first side of the elastic membrane, and wherein the second fluidic chamber comprises an upper support structure arranged to support the elastic membrane at the junction between the at least one pump zone and the lens zone from a second side of the elastic membrane so that the elastic membrane is fixed between the lower support structure and the upper support structure along the junction between the at least one pump zone and the lens zone;
a deformator embedded into the first fluidic chamber or the second fluidic chamber and configured to, in an activated state of the deformator, deform the elastic membrane within the at least one pump zone such that the elastic membrane bends towards the first fluidic chamber, thereby laterally displacing the first fluidic medium from the at least one pump zone to the lens zone and the second fluidic medium from the lens zone to the at least one pump zone along a lateral direction across the junction between the at least one pump zone and the lens zone, so that the elastic membrane is deformed in the lens zone by bending towards the second fluidic chamber and changes a focal length of the lens zone along a normal direction;
wherein the elastic membrane is fixed between the lower support structure and the upper support structure at the junction between the at least one pump zone and the lens zone such that the elastic membrane rests against the lower support structure and the upper support structure in both the activated state of the deformator and a deactivated state of the deformator;
wherein deformable portions of the lens zone and of the at least one pump zone are integrated into the elastic membrane;
wherein the deformator is configured as a ring-shaped isotropically deforming actuator extending within the at least one pump zone and the at least one pump zone laterally surrounds the lens zone;
wherein the isotropically deforming actuator is electrically activated and comprises one or more electroactive deformable layers, each sandwiched between conductive layers to form a layer stack attached to the elastic membrane via an elastic layer;
wherein the one or more electroactive deformable layers are made of an electrostrictive material;
wherein the deformation of the one or more electroactive deformable layers is activated by applying an external field between the conductive layers, thereby inducing an electrostrictive effect;
wherein, in the electrostrictive effect, the deformation induced by the external field in the electrostrictive material increases quadratically with the electric applied external field; and
wherein the deformation induced by the electrostrictive effect occurs isotropically across a plane of the one or more electroactive deformable layers.

2. The fluidic variable focal length optical lens according to claim 1, wherein the sealed housing is arranged to fix the elastic membrane along a circular line with the at least one pump zone laterally surrounding the lens zone, which is in the center of the circular line.

3. The fluidic variable focal length optical lens according to claim 1, wherein the sealed housing comprises two opposing substrate portions extending within the lens zone, wherein the two opposing substrate portions are structured within the sealed housing, and wherein each of the two opposing substrate portions is configured as a fixed lens comprising a predefined shape, thereby allowing an adjustment and/or flexible handling of focusing properties of the fluidic variable focal length optical lens.

4. The fluidic variable focal length optical lens according to claim 1, wherein the first and the second fluidic medium are liquids and/or gases selected from a group comprising water, silicone, oil, immersion oil, uncured silicone, a salt solution, a dye solution, a gel hydrogel, and air.

5. The fluidic variable focal length optical lens according to claim 1, wherein a dispersion characteristic of the first or the second fluidic medium matches a dispersion curve of the elastic membrane.

6. The fluidic variable focal length optical lens according to claim 1, wherein:
the at least one pump zone includes a first pump zone and a second pump zone; and
the lens zone is arranged between the first pump zone and the second pump zone.

7. A method for manufacturing a fluidic variable focal length optical lens, comprising:
providing a housing comprising a first fluidic chamber and a second fluidic chamber, the first and the second fluidic chambers being separated from each other by an elastic membrane, wherein the sealed housing includes a lens zone and at least one pump zone, wherein the at least one pump zone covers a first portion of the first fluidic chamber and a first portion of the second fluidic chamber, the lens zone covers a second portion of the first fluidic chamber and a second portion of the second fluidic chamber, wherein the first fluidic chamber comprises a lower support structure arranged to support the elastic membrane at a junction between the at least one pump zone and the lens zone from a first side of the elastic membrane, wherein the second fluidic chamber comprises an upper support structure arranged to support the elastic membrane at the junction between the at least one pump zone and the lens zone from a second side of the elastic membrane so that the elastic membrane is fixed between the lower support structure and the upper support structure along the junction between the at least one pump zone and the lens zone, wherein the housing further comprises a deformator embedded into the first fluidic chamber or the second fluid chamber and configured to, in an activated state of the deformator, deform the elastic membrane within the at least one pump zone such that the elastic membrane bends towards the first fluidic chamber;
filling the first fluidic chamber with a first fluidic medium and the second fluidic chamber with a second fluidic medium, wherein the first and the second fluidic media comprise different refractive indices; and
sealing the housing,
wherein, in an activated state of the deformator, the elastic membrane bends within the at least one pump zone towards the first fluidic chamber, thereby laterally displacing the first fluidic medium from the at least one pump zone to the lens zone and the second fluidic medium from the lens zone to the at least one pump zone along a lateral direction across the junction between the lens zone and the at least one pump zone, so that the elastic membrane is deformed in the lens zone by bending towards the second fluidic chamber and changes a focal length of the lens zone along a normal direction,
wherein the elastic membrane is fixed between the lower support structure and the upper support structure at the junction between the at least one pump zone and the lens zone such that the elastic membrane rests against the lower support structure and the upper support structure in both the activated state of the deformator and a deactivated state of the deformator,
wherein deformable portions of the lens zone and of the at least one pump zone are integrated into the elastic membrane;
wherein the deformator is configured as a ring-shaped isotropically deforming actuator extending within the at least one pump zone and the at least one pump zone laterally surrounds the lens zone;
wherein the isotropically deforming actuator is electrically activated and comprises one or more electroactive deformable layers, each sandwiched between conductive layers to form a layer stack attached to the elastic membrane via an elastic layer;
wherein the one or more electroactive deformable layers are made of an electrostrictive material;
wherein the deformation of the one or more electroactive deformable layers is activated by applying an external field between the conductive layers, thereby inducing an electrostrictive effect;
wherein, in the electrostrictive effect, the deformation induced by the external field in the electrostrictive material increases quadratically with the electric applied external field; and
wherein the deformation induced by the electrostrictive effect occurs isotropically across a plane of the one or more electroactive deformable layers.

8. The method according to claim 7, wherein the step of filling is performed in that the first and the second fluidic chambers are filled synchronously or one after the other before sealing the housing, wherein a pressure difference between the first and the second fluidic chamber is controllable, so that the elastic membrane remains in a same state of deformation.

9. The method according to claim 7, wherein the step of filling is based on injecting/dispensing the first fluidic medium through a first microchannel into the first fluidic chamber and the second fluidic medium through a second microchannel into the second fluidic chamber, the first and the second microchannel extending through the first and the second fluidic chamber unit within the at least one pump zone.

10. The method according to claim 9, further comprising:
submerging the housing into a vessel with reduced pressure, so that gas bubbles trapped in the first and the second fluidic chamber are released through the first and the second microchannel.

11. A fluidic variable focal length optical lens, comprising:
a sealed housing comprising a first fluidic chamber filled with a first liquid and a second fluidic chamber filled with a second liquid, the first and the second fluidic chambers being separated from each other by an elastic membrane, wherein the first and the second fluidic media comprise different refractive indices, wherein the sealed housing includes a lens zone and at least one pump zone, wherein the at least one pump zone covers a first portion of the first fluidic chamber and a first portion of the second fluidic chamber, wherein the lens zone covers a second portion of the first fluidic chamber and a second portion of the second fluidic chamber, wherein the first fluidic chamber comprises a lower support structure arranged to support the elastic membrane at a junction between the at least one pump zone and the lens zone from a first side of the elastic membrane, and wherein the second fluidic chamber comprises an upper support structure arranged to support the elastic membrane at the junction between the at least one pump zone and the lens zone from a second side of the elastic membrane so that the elastic membrane is fixed between the lower support structure and the upper support structure along the junction between the at least one pump zone and the lens zone;
a deformator embedded into the first fluidic chamber or the second fluidic chamber and configured to, in an activated state of the deformator, deform the elastic membrane within the at least one pump zone such that the elastic membrane bends towards the first fluidic chamber, thereby laterally displacing the first fluidic medium from the at least one pump zone to the lens zone and the second fluidic medium from the lens zone to the at least one pump zone along a lateral direction across the junction between the at least one pump zone and the lens zone, so that the elastic membrane is deformed in the lens zone by bending towards the second fluidic chamber and changes a focal length of the lens zone along a normal direction;

wherein the elastic membrane is fixed between the lower support structure and the upper support structure at the junction between the at least one pump zone and the lens zone such that the elastic membrane rests against the lower support structure and the upper support structure in both the activated state of the deformator and a deactivated state of the deformator;

wherein the deformator is configured as a ring-shaped isotropically deforming actuator extending within the at least one pump zone and the at least one pump zone laterally surrounds the lens zone;

wherein the isotropically deforming actuator is electrically activated and comprises one or more electroactive deformable layers, each sandwiched between conductive layers to form a layer stack attached to the elastic membrane via an elastic layer;

wherein the one or more electroactive deformable layers are made of an electrostrictive material;

wherein the deformation of the one or more electroactive deformable layers is activated by applying an external field between the conductive layers, thereby inducing an electrostrictive effect;

wherein, in the electrostrictive effect, the deformation induced by the external field in the electrostrictive material increases quadratically with the electric applied external field; and wherein the deformation induced by the electrostrictive effect occurs isotropically across a plane of the one or more electroactive deformable layers.

12. A method for manufacturing a fluidic variable focal length optical lens, comprising:

providing a housing comprising a first fluidic chamber and a second fluidic chamber, the first and the second fluidic chambers being separated from each other by an elastic membrane, wherein the sealed housing includes a lens zone and at least one pump zone, wherein the at least one pump zone covers a first portion of the first fluidic chamber and a first portion of the second fluidic chamber, the lens zone covers a second portion of the first fluidic chamber and a second portion of the second fluidic chamber, wherein the first fluidic chamber comprises a lower support structure arranged to support the elastic membrane at a junction between the at least one pump zone and the lens zone from a first side of the elastic membrane, wherein the second fluidic chamber comprises an upper support structure arranged to support the elastic membrane at the junction between the at least one pump zone and the lens zone from a second side of the elastic membrane so that the elastic membrane is fixed between the lower support structure and the upper support structure along the junction between the at least one pump zone and the lens zone, wherein the housing further comprises a deformator embedded into the first fluidic chamber or the second fluidic chamber and configured to, in an activated state of the deformator, deform the elastic membrane within the at least one pump zone such that the elastic membrane bends towards the first fluidic chamber;

filling the first fluidic chamber with a first liquid and the second fluidic chamber with a second liquid, wherein the first and the second fluidic media comprise different refractive indices; and sealing the housing, wherein, in an activated state of the deformator, the elastic membrane bends within the at least one pump zone towards the first fluidic chamber, thereby laterally displacing the first fluidic medium from the at least one pump zone to the lens zone and the second fluidic medium from the lens zone to the at least one pump zone along a lateral direction across the junction between the lens zone and the at least one pump zone, so that the elastic membrane is deformed in the lens zone by bending towards the second fluidic chamber and changes a focal length of the lens zone along a normal direction, wherein the elastic membrane is fixed between the lower support structure and the upper support structure at the junction between the at least one pump zone and the lens zone such that the elastic membrane rests against the lower support structure and the upper support structure in both the activated state of the deformator and a deactivated state of the deformator;

wherein the deformator is configured as a ring-shaped isotropically deforming actuator extending within the at least one pump zone and the at least one pump zone laterally surrounds the lens zone;

wherein the isotropically deforming actuator is electrically activated and comprises one or more electroactive deformable layers, each sandwiched between conductive layers to form a layer stack attached to the elastic membrane via an elastic layer;

wherein the one or more electroactive deformable layers are made of an electrostrictive material;

wherein the deformation of the one or more electroactive deformable layers is activated by applying an external field between the conductive layers, thereby inducing an electrostrictive effect;

wherein, in the electrostrictive effect, the deformation induced by the external field in the electrostrictive material increases quadratically with the electric applied external field; and wherein the deformation induced by the electrostrictive effect occurs isotropically across a plane of the one or more electroactive deformable layers.

* * * * *